(12) United States Patent
Miyazawa

(10) Patent No.: US 9,050,828 B2
(45) Date of Patent: *Jun. 9, 2015

(54) MOVING MECHANISM, ROBOT HAND, ELECTRONIC COMPONENT TRANSPORT DEVICE, ELECTRONIC COMPONENT INSPECTION DEVICE, LIQUID FEED PUMP, PRINTING DEVICE, PROJECTION DEVICE, AND TRANSPORT DEVICE

(71) Applicant: Seiko Epson Corporation, Tokyo (JP)

(72) Inventor: Osamu Miyazawa, Suwa (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/915,174

(22) Filed: Jun. 11, 2013

(65) Prior Publication Data

US 2013/0328967 A1 Dec. 12, 2013

(30) Foreign Application Priority Data

Jun. 12, 2012 (JP) .................................. 2012-132646

(51) Int. Cl.
*B41J 23/00* (2006.01)
*B41J 11/00* (2006.01)
*G03B 21/14* (2006.01)
*F16H 19/00* (2006.01)
*B25J 5/00* (2006.01)
(Continued)

(52) U.S. Cl.
CPC .............. *B41J 11/00* (2013.01); *G03B 21/142* (2013.01); *F16H 19/001* (2013.01);
(Continued)

(58) Field of Classification Search
CPC ..... H02N 2/026; H02N 2/103; H02N 2/0035; H02N 2/006; H02N 2/108; H02N 2/0055

USPC .......................... 347/2, 3, 5, 16, 37, 101, 104; 310/323.01, 323.02, 323.17
See application file for complete search history.

(56) References Cited

U.S. PATENT DOCUMENTS 6,252,333 B1    6/2001  Iino et al.
8,084,920 B2   12/2011  Kawai
(Continued)

FOREIGN PATENT DOCUMENTS

| JP | 05-016172 | 3/1993 |
| JP | 05-288216 | 11/1993 |
| JP | 09-001436 | 1/1997 |
| JP | 11-271480 | 10/1999 |
| JP | 2010-091348 A | 4/2010 |
| JP | 4772626 B2 | 9/2011 |

OTHER PUBLICATIONS

European Search Report for Application No. EP 13 17 1418 dated Oct. 17, 2013 (8 pages).

*Primary Examiner* — An Do
(74) *Attorney, Agent, or Firm* — Harness, Dickey & Pierce, P.L.C.

(57) ABSTRACT

A moving mechanism includes a support, a moving body arranged movably in a predetermined direction relative to the support, a first groove provided in the support parallel to the moving direction, a second groove provided in the moving body parallel to the moving direction, and facing the first groove, and a vibrating body arranged in the support or moving body and biased to press the other of the moving body or the support. A direction which the first groove and the second groove face each other intersects a direction which the support and the moving body face each other, and a biasing direction which the vibrating body is biased intersects the direction which the first groove and the second groove face each other and the direction which the support and the moving body face each other. Accordingly, backlash of the moving body with respect to the support is suppressed.

24 Claims, 16 Drawing Sheets

(51) Int. Cl.
*B23Q 1/34* (2006.01)
*B23Q 1/40* (2006.01)
*B23Q 1/42* (2006.01)

(52) U.S. Cl.
CPC ............ *Y10T 74/18992* (2015.01); *B25J 5/00* (2013.01); *B23Q 1/34* (2013.01); *B23Q 1/40* (2013.01); *B23Q 1/42* (2013.01)

(56) References Cited

U.S. PATENT DOCUMENTS

| | | | |
|---|---|---|---|
| 8,164,233 | B2 | 4/2012 | Mukae |
| 2008/0240704 | A1 | 10/2008 | Takahashi |
| 2010/0086484 | A1 | 4/2010 | Katase et al. |
| 2010/0171392 | A1 | 7/2010 | Mukae |
| 2013/0140952 | A1 | 6/2013 | Kamijo et al. |

MOVING MECHANISM, ROBOT HAND, ELECTRONIC COMPONENT TRANSPORT DEVICE, ELECTRONIC COMPONENT INSPECTION DEVICE, LIQUID FEED PUMP, PRINTING DEVICE, PROJECTION DEVICE, AND TRANSPORT DEVICE

BACKGROUND

1. Technical Field

The present invention relates to a moving mechanism, a robot hand, an electronic component transport device, an electronic component inspection device, a liquid feed pump, a printing device, a projection device, and a transport device.

2. Related Art

Various known devices are equipped with a moving mechanism that moves a moving body such as a table in a predetermined direction with respect to a support. For example, in the robot described in JP-UM-A-5-16172, a plurality of rolling bodies (balls) are inserted between rails that are provided parallel to a moving direction and rail receivers fitted with the rails and pinched from both sides, and two rows of ball guides are formed parallel to the moving direction. In the moving mechanism in which the moving body is supported by the two rows of ball guides, the balls roll, whereby the moving body can be smoothly moved.

In recent years, a piezoelectric motor has become known as a driving unit of a moving mechanism (for example, JP-A-11-271480). The piezoelectric motor generates vibration in a stretching direction and vibration in a bending direction if a voltage is applied to a vibrating body including a piezoelectric material. As a result, if the end portion in the stretching direction of the vibrating body is biased toward the moving body, the moving body can be frictionally driven by vibration in the bending direction.

However, as in JP-UM-A-5-16172, if the configuration of JP-A-11-271480 is implemented in a moving mechanism in which the moving body is supported by two rows of ball guides, and the vibrating body is biased toward the moving body, there is a problem in that backlash sometimes occurs in the moving body.

SUMMARY

The invention has been achieved in order to solve at least a part of the above-described problem in the related art. An advantage of some aspects of the invention is that it provides a moving mechanism capable of suppressing backlash of a moving body to be driven using a vibrating body.

To solve at least a part of the above-described problem, a moving mechanism according to a first aspect of the invention has the following configuration. That is, the moving mechanism includes a support which is provided at a predetermined position and supports the moving mechanism, a moving body which moves in a predetermined moving direction with respect to the support, a pair of first grooves which are provided on the support side and formed parallel to the moving direction, a pair of second grooves which are provided on the moving body side and formed to face the first grooves, a plurality of rolling bodies which are provided between the first grooves and the second grooves, and roll in accordance with movement of the moving body, a moving shaft which includes the rolling bodies rolling between the first grooves and the second grooves, and is parallel to the moving direction, and a vibrating body which includes a piezoelectric material to generate vibration and is supported by one of the support and the moving body while being biased toward the other one of the support and the moving body, wherein two rows of the moving shafts are provided to be separated from each other in a direction intersecting a direction in which the support and the moving body face each other, a direction in which the first grooves and the second grooves face each other intersects the direction in which the support and the moving body face each other, and the positional relationship between the first grooves and the second grooves is reversed between the two rows of moving shafts, and a biasing direction in which the vibrating body is biased is inclined with respect to a moving surface including to the two rows of moving shafts.

Here, it is assumed that "the direction which is inclined with respect to the moving surface" does not include a direction parallel to the moving surface or a direction perpendicular to the moving surface.

In the moving mechanism according to the first aspect of the invention, if the vibrating body is supported on the support side, the moving body receives a biasing force of the vibrating body, and if the vibrating body is supported on the moving body side, the moving body receives a reactive force in an opposite direction to the biasing direction of the vibrating body. Since the biasing direction of the vibrating body is inclined with respect to the moving surface, the biasing force or the reaction force received by the moving body includes a component parallel to the moving surface and a component perpendicular to the moving surface. If the moving body receives the force parallel to the moving surface, in one moving shaft of the two rows of moving shafts, the interval between the first grooves and the second grooves in the direction parallel to the moving surface is reduced or clogged, and the rolling body is pinched between the first grooves and the second grooves. In the other moving shaft, while the interval between the first grooves and the second grooves is extended, the moving body receives the force perpendicular to the moving surface, and a moment which allows the rotation of the moving body with one moving shaft as a rotation axis is generated, whereby the rolling bodies are pinched between the first grooves and the second grooves in the direction perpendicular to the moving surface. As a result, it is possible to suppress backlash of the moving body.

The moving mechanism according to the first aspect of the invention can also be implemented as the following form. That is, the moving mechanism according to the first aspect of the invention as another form includes a support which is provided at a predetermined position and supports the moving mechanism, a moving body which rotationally moves with respect to the support, a first groove which is provided on the support side and formed in a circular shape, a second groove which is provided on the moving body side and formed in a circular shape to face the first groove, a plurality of rolling bodies which are provided between the first groove and the second groove, and roll in accordance with movement of the moving body, a circular moving shaft which includes the rolling bodies rolling between the first groove and the second groove, and a vibrating body which includes a piezoelectric material to generate vibration and is supported by one of the support and the moving body while being biased toward the other one of the support and the moving body, wherein the first groove and the second groove are arranged such that one circle is positioned inside the other circle, a direction in which the first groove and the second groove face each other intersects a direction in which the support and the moving body face each other, and a biasing direction in which the vibrating body is biased is inclined with respect to a moving surface including the circular moving shaft.

In this moving mechanism, the moving body receives a force parallel to the moving surface, whereby, at one location of two locations symmetrical to the center of the circular moving shaft, the interval between the first groove and the second groove is reduced or clogged in a direction parallel to the moving surface, and the rolling body is pinched between the first groove and the second groove. At the other location, while the interval between the first groove and the second groove is extended, the moving body receives a force perpendicular to the moving surface, whereby a moment which allows the rotation of the moving body with one location as an axis is generated, and the rolling body is pinched between the first groove and the second groove in a direction perpendicular to the moving surface. As a result, it is possible to suppress backlash of the moving body.

To solve at least a part of the above-described problem, a moving mechanism according to a second aspect of the invention has the following configuration. That is, the moving mechanism includes a support which is provided at a predetermined position and supports the moving mechanism, a moving body which moves in a predetermined moving direction with respect to the support, a pair of first grooves which are provided on the support side and formed parallel to the moving direction, a pair of second grooves which are provided on the moving body side and formed to face the first grooves, a plurality of rolling bodies which are provided between the first grooves and the second grooves, and roll in accordance with movement of the moving body, a moving shaft which includes the rolling bodies rolling between the first grooves and the second grooves, and is parallel to the moving direction, and a vibrating body which includes a piezoelectric material to generate vibration and is supported by one of the support and the moving body while being biased toward the other one of the support and the moving body, wherein two rows of the moving shafts are provided to be separated from each other in a direction intersecting a direction in which the support and the moving body face each other, a direction in which the first grooves and the second grooves face each other intersects the direction in which the support and the moving body face each other, and the positional relationship between the first grooves and the second grooves is reversed between the two rows of moving shafts, the vibrating body is biased toward one of the support and the moving body at a position separated from a moving surface including the two rows of moving shafts, and a biasing direction in which the vibrating body is biased is parallel to the moving surface and intersects the moving direction.

In the moving mechanism according to the second aspect of the invention, if the vibrating body is supported on the support side, the moving body receives a biasing force of the vibrating body, and if the vibrating body is supported on the moving body side, the moving body receives a reaction force in an opposite direction to the biasing direction of the vibrating body. The vibrating body is biased parallel to the moving surface, and in one moving shaft of the two rows of moving shafts, the interval between the first grooves and the second grooves is reduced or clogged in a direction parallel to the moving surface, and the rolling body is pinched between the first grooves and the second grooves. In the other moving shaft, while the interval between the first grooves and the second grooves is extended, the moving body receives a force parallel to the moving surface at a position separated from the moving surface, whereby a moment which allows the rotation of the moving body with one moving shaft as a rotation axis is generated, and the rolling body is pinched between the first grooves and the second grooves in a direction perpendicular to the moving surface. As a result, it is possible to suppress backlash of the moving body.

The moving mechanism according to the second aspect of the invention can also be implemented as the following form. That is, the moving mechanism according to the second aspect of the invention as another form includes a support which is provided at a predetermined position and supports the moving mechanism, a moving body which rotationally moves with respect to the support, a first groove which is provided on the support side and formed in a circular shape, a second groove which is provided on the moving body side and formed in a circular shape to face the first groove, a plurality of rolling bodies which are provided between the first groove and the second groove, and roll in accordance with movement of the moving body, a circular moving shaft which includes the rolling bodies rolling between the first groove and the second groove, and a vibrating body which includes a piezoelectric material to generate vibration and is supported by one of the support and the moving body while being biased toward the other one of the support and the moving body, wherein the first groove and the second groove are arranged such that one circle is positioned inside the other circle, a direction in which the first groove and the second groove face each other intersects a direction in which the support and the moving body face each other, the vibrating body is biased toward one of the support and the moving body at a position separated from a moving surface including the circular moving shaft, and a biasing direction in which the vibrating body is biased is parallel to the moving surface and intersects the moving direction.

In this moving mechanism, the vibrating body is biased parallel to the moving surface, and in one location of two locations symmetrical to the center of the circular moving shaft, the interval between the first groove and the second groove is reduced or clogged in a direction parallel to the moving surface, and the rolling body is pinched between the first groove and the second groove. In the other location, while the interval between the first groove and the second groove is extended, the moving body receives a force parallel to the moving surface at a position separated from the moving surface, whereby a moment which allows the rotation of the moving body with one location as an axis is generated, and the rolling body is pinched between the first groove and the second groove in a direction perpendicular to the moving surface. As a result, it is possible to suppress backlash of the moving body.

In this moving mechanism according to the aspect of the invention, in a portion of one of the support and the moving body to which the vibrating body is biased, a pressure receiving body which is formed in a substantially rectangular parallelepiped shape may be provided or buried in a posture such that a surface toward which the vibrating body is biased and the biasing direction are perpendicular to each other.

With this, even if the vibrating body is biased obliquely with respect to the support or the moving body, there is no case where the pressure receiving body escapes by the biasing force (the position of the pressure receiving body is shifted in a direction parallel to the moving surface), and the driving force of the vibrating body can be appropriately transmitted to the pressure receiving body to move the moving body with respect to the support with high precision.

In the moving mechanism according to the above-described aspects of the invention, the pressure receiving body may be formed of a material having a hardness that is higher than that of one of the support and the moving body in which the pressure receiving body is provided.

With this, it is possible to suppress abrasion of the pressure receiving body by a frictional force which acts between the vibrating body and the pressure receiving body. As a result, it is possible to suppress degradation in the movement precision of the moving body even for long-term use.

The invention can also be implemented as the following form. That is, the invention can be implemented as a robot hand including a plurality of finger portions, a base on which the finger portions are movably provided upright, and a moving mechanism which moves the finger portions with respect to the base, wherein the moving mechanism includes a support which is provided at a predetermined position and supports the moving mechanism, a moving body which moves in a predetermined moving direction with respect to the support, a pair of first grooves which are provided on the support side and formed parallel to the moving direction, a pair of second grooves which are provided on the moving body side and formed to face the first grooves, a plurality of rolling bodies which are provided between the first grooves and the second grooves, and roll in accordance with movement of the moving body, a moving shaft which includes the rolling bodies rolling between the first grooves and the second grooves, and is parallel to the moving direction, and a vibrating body which includes a piezoelectric material to generate vibration and is supported by one of the support and the moving body while being biased toward the other one of the support and the moving body, two rows of the moving shafts are provided to be separated from each other in a direction intersecting a direction in which the support and the moving body face each other, a direction in which the first grooves and the second grooves face each other intersects the direction in which the support and the moving body face each other, and the positional relationship between the first grooves and the second grooves is reversed between the two rows of moving shafts, and a biasing direction in which the vibrating body is biased is inclined with respect to a moving surface including the two rows of moving shafts.

In this robot hand according to the aspect of the invention, it is possible to suppress backlash of the moving body, making it possible to increase precision of holding an object by the finger portions.

The invention can also be implemented as the following form. That is, the invention can be implemented as a robot hand including a plurality of finger portions, a base on which the finger portions are movably provided upright, and a moving mechanism which moves the finger portions with respect to the base, wherein the moving mechanism includes a support which is provided at a predetermined position and supports the moving mechanism, a moving body which moves in a predetermined moving direction with respect to the support, a pair of first grooves which are provided on the support side and formed parallel to the moving direction, a pair of second grooves which are provided on the moving body side and formed to face the first grooves, a plurality of rolling bodies which are provided between the first grooves and the second grooves, and roll in accordance with movement of the moving body, a moving shaft which includes the rolling bodies rolling between the first grooves and the second grooves, and is parallel to the moving direction, and a vibrating body which includes a piezoelectric material to generate vibration and is supported by one of the support and the moving body while being biased toward the other one of the support and the moving body, two rows of the moving shafts are provided to be separated from each other in a direction intersecting a direction in which the support and the moving body face each other, a direction in which the first grooves and the second grooves face each other intersects the direction in which the support and the moving body face each other, and the positional relationship between the first grooves and the second grooves is reversed between the two rows of moving shafts, the vibrating body is biased toward one of the support and the moving body at a position separated from a moving surface including the two rows of moving shafts, and a biasing direction in which the vibrating body is biased is parallel to the moving surface and intersects the moving direction.

In this robot hand according to the aspect of the invention, it is possible to suppress backlash of the moving body, making it possible to increase precision of holding an object by the finger portions.

The invention can also be implemented as the following form. That is, the invention can be implemented as an electronic component transport device including a holding unit which holds an electronic component, and a moving mechanism which moves the holding unit holding the electronic component, wherein the moving mechanism includes a support which is provided at a predetermined position and supports the moving mechanism, a moving body which moves in a predetermined moving direction with respect to the support, a pair of first grooves which are provided on the support side and formed parallel to the moving direction, a pair of second grooves which are provided on the moving body side and formed to face the first grooves, a plurality of rolling bodies which are provided between the first grooves and the second grooves, and roll in accordance with movement of the moving body, a moving shaft which includes the rolling bodies rolling between the first grooves and the second grooves, and is parallel to the moving direction, and a vibrating body which includes a piezoelectric material to generate vibration and is supported by one of the support and the moving body while being biased toward the other one of the support and the moving body, two rows of the moving shafts are provided to be separated from each other in a direction intersecting a direction in which the support and the moving body face each other, a direction in which the first grooves and the second grooves face each other intersects the direction in which the support and the moving body face each other, and the positional relationship between the first grooves and the second grooves is reversed between the two rows of moving shafts, and a biasing direction in which the vibrating body is biased is inclined with respect to a moving surface including to the two rows of moving shafts.

In this electronic component transport device according to the aspect of the invention, it is possible to suppress backlash of the moving body, making it possible to increase precision of transporting the electronic component.

The invention can also be implemented as the following form. That is, the invention can be implemented as an electronic component transport device including a holding unit which holds an electronic component, and a moving mechanism which moves the holding unit holding the electronic component, wherein the moving mechanism includes a support which is provided at a predetermined position and supports the moving mechanism, a moving body which moves in a predetermined moving direction with respect to the support, a pair of first grooves which are provided on the support side and formed parallel to the moving direction, a pair of second grooves which are provided on the moving body side and formed to face the first grooves, a plurality of rolling bodies which are provided between the first grooves and the second grooves, and roll in accordance with movement of the moving body, a moving shaft which includes the rolling bodies rolling between the first grooves and the second grooves, and is parallel to the moving direction, and a vibrating body which includes a piezoelectric material to generate vibration and is supported by one of the support and the moving body while being biased toward the other one of the support and the moving body, two rows of the moving shafts are provided to be separated from each other in a direction intersecting a direction in which the support and the moving body face each other, a direction in which the first grooves and the second grooves face each other intersects the direction in which the support and the moving body face each other, and the positional relationship between the first grooves and the second grooves is reversed between the two rows of moving shafts, the vibrating body is biased toward one of the support and the moving body at a position separated from a moving surface including the two rows of moving shafts, and a biasing direction in which the vibrating body is biased is parallel to the moving surface and intersects the moving direction.

In this electronic component transport device according to the aspect of the invention, it is possible to suppress backlash of the moving body, making it possible to increase precision of transporting the electronic component.

The invention can also be implemented as the following form. That is, the invention can be implemented as an electronic component inspection device including a holding unit which holds an electronic component, a moving mechanism which moves the holding unit holding the electronic component, and an inspection unit which inspects the electronic component, wherein the moving mechanism includes a support which is provided at a predetermined position and supports the moving mechanism, a moving body which moves in a predetermined moving direction with respect to the support, a pair of first grooves which are provided on the support side and formed parallel to the moving direction, a pair of second grooves which are provided on the moving body side and formed to face the first grooves, a plurality of rolling bodies which are provided between the first grooves and the second grooves, and roll in accordance with movement of the moving body, a moving shaft which includes the rolling bodies rolling between the first grooves and the second grooves, and is parallel to the moving direction, and a vibrating body which includes a piezoelectric material to generate vibration and is supported by one of the support and the moving body while being biased toward the other one of the support and the moving body, two rows of the moving shafts are provided to be separated from each other in a direction intersecting a direction in which the support and the moving body face each other, a direction in which the first grooves and the second grooves face each other intersects the direction in which the support and the moving body face each other, and the positional relationship between the first grooves and the second grooves is reversed between the two rows of moving shafts, and a biasing direction in which the vibrating body is biased is inclined with respect to a moving surface including the two rows of moving shafts.

In this electronic component inspection device according to the aspect of the invention, it is possible to suppress backlash of the moving body, making it possible to increase precision of inspecting the electronic component.

The invention can also be implemented as the following form. That is, the invention can be implemented as an electronic component inspection device including a holding unit which holds an electronic component, a moving mechanism which moves the holding unit holding the electronic component, and an inspection unit which inspects the electronic component, wherein the moving mechanism includes a support which is provided at a predetermined position and supports the moving mechanism, a moving body which moves in a predetermined moving direction with respect to the support, a pair of first grooves which are provided on the support side and formed parallel to the moving direction, a pair of second grooves which are provided on the moving body side and formed to face the first grooves, a plurality of rolling bodies which are provided between the first grooves and the second grooves, and roll in accordance with movement of the moving body, a moving shaft which includes the rolling bodies rolling between the first grooves and the second grooves, and is parallel to the moving direction, and a vibrating body which includes a piezoelectric material to generate vibration and is supported by one of the support and the moving body while being biased toward the other one of the support and the moving body, two rows of the moving shafts are provided to be separated from each other in a direction intersecting a direction in which the support and the moving body face each other, a direction in which the first grooves and the second grooves face each other intersects the direction in which the support and the moving body face each other, and the positional relationship between the first grooves and the second grooves is reversed between the two rows of moving shafts, the vibrating body is biased toward one of the support and the moving body at a position separated from a moving surface including the two rows of moving shafts, and a biasing direction in which the vibrating body is biased is parallel to the moving surface and intersects the moving direction.

In this electronic component inspection device according to the aspect of the invention, it is possible to suppress backlash of the moving body, making it possible to increase precision of inspecting the electronic component.

The invention can also be implemented as the following form. That is, the invention can be implemented as a liquid feed pump including a tube through which a liquid is flowable, a blocking unit which comes into contact with the tube to block the tube, and a moving mechanism which moves the blocking unit, wherein the moving mechanism includes a support which is provided at a predetermined position and supports the moving mechanism, a moving body which moves in a predetermined moving direction with respect to the support, a pair of first grooves which are provided on the support side and formed parallel to the moving direction, a pair of second grooves which are provided on the moving body side and formed to face the first grooves, a plurality of rolling bodies which are provided between the first grooves and the second grooves, and roll in accordance with movement of the moving body, a moving shaft which includes the rolling bodies rolling between the first grooves and the second grooves, and is parallel to the moving direction, and a vibrating body which includes a piezoelectric material to generate vibration and is supported by one of the support and the moving body while being biased toward the other one of the support and the moving body, two rows of the moving shafts are provided to be separated from each other in a direction intersecting a direction in which the support and the moving body face each other, a direction in which the first grooves and the second grooves face each other intersects the direction in which the support and the moving body face each other, and the positional relationship between the first grooves and the second grooves is reversed between the two rows of moving shafts, and a biasing direction in which the vibrating body is biased is inclined with respect to a moving surface including to the two rows of moving shafts.

In this liquid feed pump according to the aspect of the invention, it is possible to suppress backlash of the moving body, making it possible to increase precision of feeding a liquid in the tube.

The invention can also be implemented as the following form. That is, the invention can be implemented as a liquid feed pump including a tube through which a liquid is flowable, a blocking unit which comes into contact with the tube to block the tube, and a moving mechanism which moves the blocking unit, wherein the moving mechanism includes a support which is provided at a predetermined position and supports the moving mechanism, a moving body which moves in a predetermined moving direction with respect to the support, a pair of first grooves which are provided on the support side and formed parallel to the moving direction, a pair of second grooves which are provided on the moving body side and formed to face the first grooves, a plurality of rolling bodies which are provided between the first grooves and the second grooves, and roll in accordance with movement of the moving body, a moving shaft which includes the rolling bodies rolling between the first grooves and the second grooves, and is parallel to the moving direction, and a vibrating body which includes a piezoelectric material to generate vibration and is supported by one of the support and the moving body while being biased toward the other one of the support and the moving body, two rows of the moving shafts are provided to be separated from each other in a direction intersecting a direction in which the support and the moving body face each other, a direction in which the first grooves and the second grooves face each other intersects the direction in which the support and the moving body face each other, and the positional relationship between the first grooves and the second grooves is reversed between the two rows of moving shafts, the vibrating body is biased toward one of the support and the moving body at a position separated from a moving surface including the two rows of moving shafts, and a biasing direction in which the vibrating body is biased is parallel to the moving surface and intersects the moving direction.

In this liquid feed pump according to the aspect of the invention, it is possible to suppress backlash of the moving body, making it possible to increase precision of feeding a liquid in the tube.

The invention can also be implemented as the following form. That is, the invention can be implemented as a printing device including a print head which prints an image on a medium, and a moving mechanism which moves the print head, wherein the moving mechanism includes a support which is provided at a predetermined position and supports the moving mechanism, a moving body which moves in a predetermined moving direction with respect to the support, a pair of first grooves which are provided on the support side and formed parallel to the moving direction, a pair of second grooves which are provided on the moving body side and formed to face the first grooves, a plurality of rolling bodies which are provided between the first grooves and the second grooves, and roll in accordance with movement of the moving body, a moving shaft which includes the rolling bodies rolling between the first grooves and the second grooves, and is parallel to the moving direction, and a vibrating body which includes a piezoelectric material to generate vibration and is supported by one of the support and the moving body while being biased toward the other one of the support and the moving body, two rows of the moving shafts are provided to be separated from each other in a direction intersecting a direction in which the support and the moving body face each other, a direction in which the first grooves and the second grooves face each other intersects the direction in which the support and the moving body face each other, and the positional relationship between the first grooves and the second grooves is reversed between the two rows of moving shafts, and a biasing direction in which the vibrating body is biased is inclined with respect to a moving surface including the two rows of moving shafts.

In this printing device according to the aspect of the invention, it is possible to suppress backlash of the moving body, making it possible to increase precision of printing an image.

The invention can also be implemented as the following form. That is, the invention can be implemented as a printing device including a print head which prints an image on a medium, and a moving mechanism which moves the print head, wherein the moving mechanism includes a support which is provided at a predetermined position and supports the moving mechanism, a moving body which moves in a predetermined moving direction with respect to the support, a pair of first grooves which are provided on the support side and formed parallel to the moving direction, a pair of second grooves which are provided on the moving body side and formed to face the first grooves, a plurality of rolling bodies which are provided between the first grooves and the second grooves, and roll in accordance with movement of the moving body, a moving shaft which includes the rolling bodies rolling between the first grooves and the second grooves, and is parallel to the moving direction, and a vibrating body which includes a piezoelectric material to generate vibration and is supported by one of the support and the moving body while being biased toward the other one of the support and the moving body, two rows of the moving shafts are provided to be separated from each other in a direction intersecting a direction in which the support and the moving body face each other, a direction in which the first grooves and the second grooves face each other intersects the direction in which the support and the moving body face each other, and the positional relationship between the first grooves and the second grooves is reversed between the two rows of moving shafts, the vibrating body is biased toward one of the support and the moving body at a position separated from a moving surface including the two rows of moving shafts, and a biasing direction in which the vibrating body is biased is parallel to the moving surface and intersects the moving direction.

In this printing device according to the aspect of the invention, it is possible to suppress backlash of the moving body, making it possible to increase precision of printing an image.

The invention can also be implemented as the following form. That is, the invention can be implemented as a projection device including a light source which generates light, a projection unit which includes an optical lens and projects light, and a moving mechanism which moves the optical lens, wherein the moving mechanism includes a support which is provided at a predetermined position and supports the moving mechanism, a moving body which moves in a predetermined moving direction with respect to the support, a pair of first grooves which are provided on the support side and formed parallel to the moving direction, a pair of second grooves which are provided on the moving body side and formed to face the first grooves, a plurality of rolling bodies which are provided between the first grooves and the second grooves, and roll in accordance with movement of the moving body, a moving shaft which includes the rolling bodies rolling between the first grooves and the second grooves, and is parallel to the moving direction, and a vibrating body which includes a piezoelectric material to generate vibration and is supported by one of the support and the moving body while being biased toward the other one of the support and the moving body, two rows of the moving shafts are provided to be separated from each other in a direction intersecting a direction in which the support and the moving body face each other, a direction in which the first grooves and the second grooves face each other intersects the direction in which the support and the moving body face each other, and the positional relationship between the first grooves and the second grooves is reversed between the two rows of moving shafts, and a biasing direction in which the vibrating body is biased is inclined with respect to a moving surface including to the two rows of moving shafts.

In this projection device according to the aspect of the invention, it is possible to suppress backlash of the moving body, making it possible to increase precision of adjusting the projection state of light by the optical lens.

The invention can also be implemented as the following form. That is, the invention can be implemented as a projection device including a light source which generates light, a projection unit which includes an optical lens and projects light, and a moving mechanism which moves the optical lens, wherein the moving mechanism includes a support which is provided at a predetermined position and supports the moving mechanism, a moving body which moves in a predetermined moving direction with respect to the support, a pair of first grooves which are provided on the support side and formed parallel to the moving direction, a pair of second grooves which are provided on the moving body side and formed to face the first grooves, a plurality of rolling bodies which are provided between the first grooves and the second grooves, and roll in accordance with movement of the moving body, a moving shaft which includes the rolling bodies rolling between the first grooves and the second grooves, and is parallel to the moving direction, and a vibrating body which includes a piezoelectric material to generate vibration and is supported by one of the support and the moving body while being biased toward the other one of the support and the moving body, two rows of the moving shafts are provided to be separated from each other in a direction intersecting a direction in which the support and the moving body face each other, a direction in which the first grooves and the second grooves face each other intersects the direction in which the support and the moving body face each other, and the positional relationship between the first grooves and the second grooves is reversed between the two rows of moving shafts, the vibrating body is biased toward one of the support and the moving body at a position separated from a moving surface including the two rows of moving shafts, and a biasing direction in which the vibrating body is biased is parallel to the moving surface and intersects the moving direction.

In this projection device according to the aspect of the invention, it is possible to suppress backlash of the moving body, making it possible to increase precision of adjusting the projection state of light by the optical lens.

The invention can also be implemented as the following form. That is, the invention can be implemented as a transport device including a support which is provided at a predetermined position and supports the transport device, a moving body which moves in a predetermined moving direction with respect to the support, a pair of first grooves which are provided on the support side and formed parallel to the moving direction, a pair of second grooves which are provided on the moving body side and formed to face the first grooves, a plurality of rolling bodies which are provided between the first grooves and the second grooves, and roll in accordance with movement of the moving body, a moving shaft which includes the rolling bodies rolling between the first grooves and the second grooves, and is parallel to the moving direction, and a vibrating body which includes a piezoelectric material to generate vibration and is supported by one of the support and the moving body while being biased toward the other one of the support and the moving body, wherein two rows of the moving shafts are provided to be separated from each other in a direction intersecting a direction in which the support and the moving body face each other, a direction in which the first grooves and the second grooves face each other intersects the direction in which the support and the moving body face each other, and the positional relationship between the first grooves and the second grooves is reversed between the two rows of moving shafts, and a biasing direction in which the vibrating body is biased is inclined with respect to a moving surface including the two rows of moving shafts.

In this transport device according to the aspect of the invention, it is possible to suppress backlash of the moving body, making it possible to increase precision of transporting an object.

The invention can also be implemented as the following form. That is, the invention can be implemented as a transport device including a support which is provided at a predetermined position and supports the transport device, a moving body which moves in a predetermined moving direction with respect to the support, a pair of first grooves which are provided on the support side and formed parallel to the moving direction, a pair of second grooves which are provided on the moving body side and formed to face the first grooves, a plurality of rolling bodies which are provided between the first grooves and the second grooves, and roll in accordance with movement of the moving body, a moving shaft which includes the rolling bodies rolling between the first grooves and the second grooves, and is parallel to the moving direction, and a vibrating body which includes a piezoelectric material to generate vibration and is supported by one of the support and the moving body while being biased toward the other one of the support and the moving body, wherein two rows of the moving shafts are provided to be separated from each other in a direction intersecting a direction in which the support and the moving body face each other, a direction in which the first grooves and the second grooves face each other intersects the direction in which the support and the moving body face each other, and the positional relationship between the first grooves and the second grooves is reversed between the two rows of moving shafts, the vibrating body is biased toward one of the support and the moving body at a position separated from a moving surface including the two rows of moving shafts, and a biasing direction in which the vibrating body is biased is parallel to the moving surface and intersects the moving direction.

In this transport device according to the aspect of the invention, it is possible to suppress backlash of the moving body, making it possible to increase precision of transporting an object.

The invention can also be implemented as the following form. That is, the invention can be implemented as a robot including an arm portion which is provided with a rotatable joint portion, a hand portion which is provided in the arm portion, a main body portion which is provided with the arm portion, and a rotating mechanism which is provided in the joint portion and rotates the joint portion, wherein the rotating mechanism includes a support which is provided at a predetermined position and supports the rotating mechanism, a moving body which rotationally moves with respect to the support, a first groove which is provided on the support side and formed in a circular shape, a second groove which is provided on the moving body side and formed in a circular shape to face the first groove, a plurality of rolling bodies which are provided between the first groove and the second groove, and roll in accordance with movement of the moving body, a circular moving shaft which includes the rolling bodies rolling between the first groove and the second groove, and a vibrating body which includes a piezoelectric material to generate vibration and is supported by one of the support and the moving body while being biased toward the other one of the support and the moving body, the first groove and the second groove are arranged such that one circle is positioned inside the other circle, and a direction in which the first groove and the second groove face each other intersects a direction in which the support and the moving body face each other, and a biasing direction in which the vibrating body is biased is inclined with respect to a moving surface including the circular moving shaft.

In this robot according to the aspect of the invention, it is possible to suppress backlash of the moving body, making it possible to increase operation precision of the robot. For example, the hand portion can be a hand portion which performs an operation to hold an object, an operation to fasten a screw, a painting operation, a welding operation, or the like.

The invention can also be implemented as the following form. That is, the invention can be implemented as a robot including an arm portion which is provided with a rotatable joint portion, a hand portion which is provided in the arm portion, a main body portion which is provided with the arm portion, and a rotating mechanism which is provided in the joint portion and rotates the joint portion, wherein the rotating mechanism includes a support which is provided at a predetermined position and supports the rotating mechanism, a moving body which rotationally moves with respect to the support, a first groove which is provided on the support side and formed in a circular shape, a second groove which is provided on the moving body side and formed in a circular shape to face the first groove, a plurality of rolling bodies which are provided between the first groove and the second groove, and roll in accordance with movement of the moving body, a circular moving shaft which includes the rolling bodies rolling between the first groove and the second groove, and a vibrating body which includes a piezoelectric material to generate vibration and is supported by one of the support and the moving body while being biased toward the other one of the support and the moving body, the first groove and the second groove are arranged such that one circle is positioned inside the other circle, and a direction in which the first groove and the second groove face each other intersects a direction in which the support and the moving body face each other, the vibrating body is biased toward one of the support and the moving body at a position separated from a moving surface including the circular moving shaft, and a biasing direction in which the vibrating body is biased is parallel to the moving surface and intersects the moving direction.

In this robot according to the aspect of the invention, it is possible to suppress backlash of the moving body, making it possible to increase operation precision of the robot. For example, the hand portion can be a hand portion which performs an operation to hold an object, an operation to fasten a screw, a painting operation, a welding operation, or the like.

The invention can also be implemented as the following form. That is, the invention can be implemented as an electronic clock including a rotatable rotating disc which is coaxially provided with a gear, a gear train which includes a plurality of gears, an indicator which is connected to the gear train and indicates the time, and a rotating mechanism which rotates the rotating disc, wherein the rotating mechanism includes a support which is provided at a predetermined position and supports the rotating mechanism, a moving body which rotationally moves with respect to the support, a first groove which is provided on the support side and formed in a circular shape, a second groove which is provided on the moving body side and formed in a circular shape to face the first groove, a plurality of rolling bodies which are provided between the first groove and the second groove, and roll in accordance with movement of the moving body, a circular moving shaft which includes the rolling bodies rolling between the first groove and the second groove, and a vibrating body which includes a piezoelectric material to generate vibration and is supported by one of the support and the moving body while being biased toward the other one of the support and the moving body, the first groove and the second groove are arranged such that one circle is positioned inside the other circle, and a direction in which the first groove and the second groove face each other intersects a direction in which the support and the moving body face each other, and a biasing direction in which the vibrating body is biased is inclined with respect to a moving surface including the circular moving shaft.

In this electronic clock according to the aspect of the invention, it is possible to suppress backlash of the moving body, making it possible to increase operation precision of the electronic clock.

The invention can also be implemented as the following form. That is, the invention can be implemented as an electronic clock including a rotatable rotating disc which is coaxially provided with a gear, a gear train which includes a plurality of gears, an indicator which is connected to the gear train and indicates the time, and a rotating mechanism which rotates the rotating disc, wherein the rotating mechanism includes a support which is provided at a predetermined position and supports the rotating mechanism, a moving body which rotationally moves with respect to the support, a first groove which is provided on the support side and formed in a circular shape, a second groove which is provided on the moving body side and formed in a circular shape to face the first groove, a plurality of rolling bodies which are provided between the first groove and the second groove, and roll in accordance with movement of the moving body, a circular moving shaft which includes the rolling bodies rolling between the first groove and the second groove, and a vibrating body which includes a piezoelectric material to generate vibration and is supported by one of the support and the moving body while being biased toward the other one of the support and the moving body, the first groove and the second groove are arranged such that one circle is positioned inside the other circle, and a direction in which the first groove and the second groove face each other intersects a direction in which the support and the moving body face each other, the vibrating body is biased toward one of the support and the moving body at a position separated from a moving surface including the circular moving shaft, and a biasing direction in which the vibrating body is biased is parallel to the moving surface and intersects the moving direction.

In this electronic clock according to the aspect of the invention, it is possible to suppress backlash of the moving body, making it possible to increase operation precision of the electronic clock.

BRIEF DESCRIPTION OF THE DRAWINGS

Embodiments of the invention will be described with reference to the accompanying drawings, wherein like numbers reference like elements.

DESCRIPTION OF EXEMPLARY
EMBODIMENTS

Figure 1A:
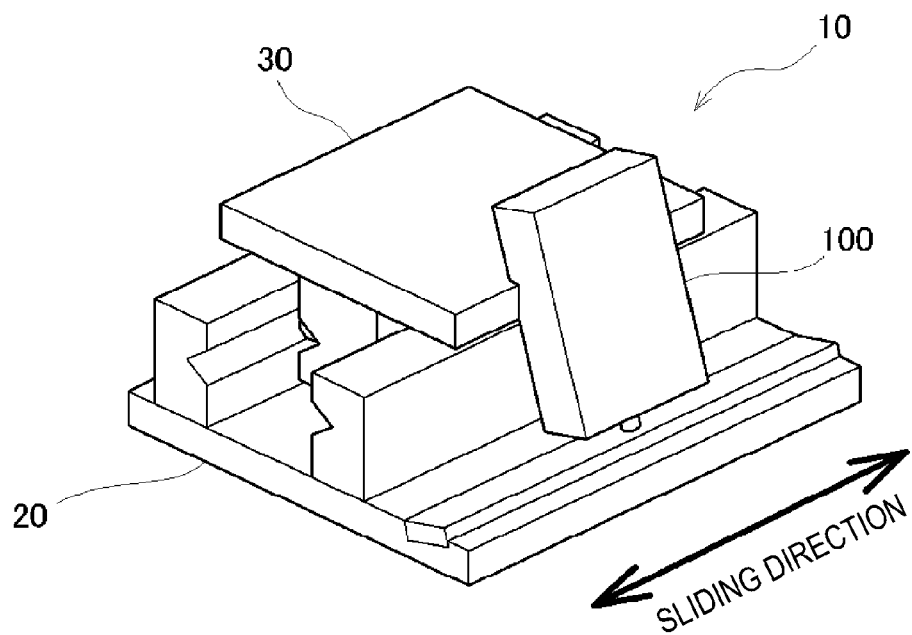
FIGS. 1A and 1B are perspective views showing the configuration of a moving mechanism of this example.
Figure 1B:
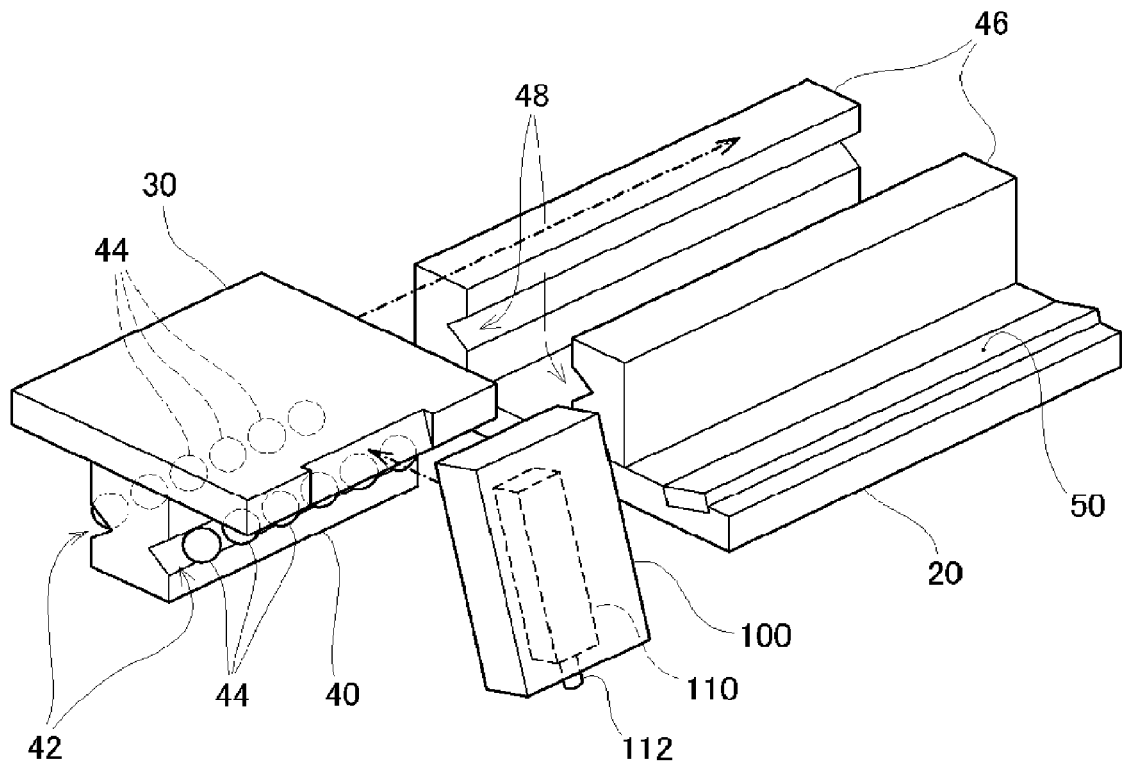

FIGS. 1A and 1B are perspective views showing the configuration of a moving mechanism 10 of this example. FIG. 1A is an overall view of the moving mechanism 10 of this example, and FIG. 1B is an exploded view. As shown in FIG. 1A, the moving mechanism 10 of this example has a support 20, a table 30 which moves in a predetermined moving direction with respect to the support 20, and a piezoelectric motor 100 which drives the table 30. In this example, the table 30 is provided above the support 20, and the piezoelectric motor 100 is attached to the side of the table 30. A bold arrow in the drawing represents the moving direction of the table 30, and the table 30 is movable from the near side of the drawing to the far side or from the far side toward the near side. The table 30 of this example corresponds to a "moving body".

As shown in FIG. 1B, the table 30 has a substantially rectangular flat plate shape, and a guide rail 40 is vertically provided from the lower surface (the surface facing the support 20) of the table 30. The guide rail 40 is provided parallel to the moving direction, and inner grooves 42 having a V-shaped cross-section are formed in both lateral surfaces of the guide rail 40. The inner grooves 42 of this example correspond to "second grooves".

The support 20 is formed in a substantially rectangular flat plate shape, and a pair of rail receivers 46 with the guide rail 40 pinched from both sides are uprightly provided in the upper surface (the surface facing the table 30) of the support 20. In the inner wall surfaces of the rail receivers 46, outer grooves 48 having a V-shaped cross-section are formed to face the inner grooves 42 of the guide rail 40. A pressure receiving body 50 having a substantially rectangular parallelepiped shape is provided or buried in the upper surface of the support 20 parallel to the rail receivers 46. The outer grooves 48 of this example correspond to "first grooves".

A plurality of balls 44 are inserted between the inner grooves 42 of the guide rail 40 and the outer grooves 48 of the rail receivers 46. The plurality of balls 44 form two rows of ball guides between the support 20 and the table 30, and the balls 44 roll along the inner grooves 42 and the outer grooves 48, whereby the table 30 moves smoothly with respect to the support 20. The balls 44 of this example correspond to "rolling bodies".

A vibrating body 110 which is formed to include a piezoelectric material is provided or embedded in the piezoelectric motor 100. The vibrating body 110 is formed in a rectangular parallelepiped shape, and a cylindrical convex portion 112 is provided in an end surface of the vibrating body 110 in a longitudinal direction.

Figure 2:
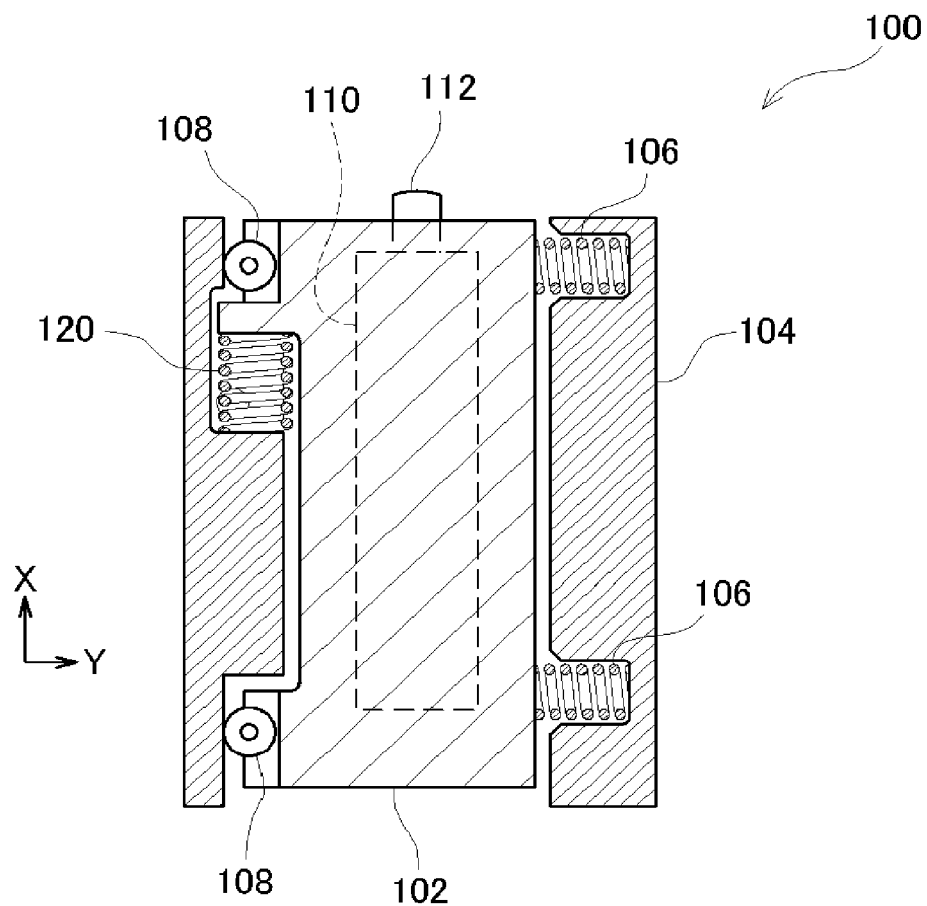
FIG. 2 is a sectional view showing the internal structure of a piezoelectric motor.

FIG. 2 is a sectional view showing the internal structure of the piezoelectric motor 100. As shown in FIG. 2, the vibrating body 110 is retained in a vibrating body case 102 in a state where the convex portion 112 protrudes, and the vibrating body case 102 is housed in a housing case 104 in a form to be movable in a direction (X direction) in which the convex portion 112 protrudes. Lateral pressure springs 106 which bias the vibrating body case 102 in a Y direction are provided between one of the lateral surfaces (the surfaces in a direction (Y direction) perpendicular to the X direction) of the vibrating body case 102 and the housing case 104. Rollers 108 which roll in the X direction are provided between the other lateral surface (a side opposite to the side on which the lateral pressure spring 106 is provided) of the vibrating body case 102 and the housing case 104. As a result, the vibrating body case 102 can move smoothly in the X direction while the movement in the Y direction is regulated. A biasing spring 120 is provided on the same side as the side on which the rollers 108 are provided, and the biasing spring 120 biases the vibrating body case 102 in the X direction (the side on which the convex portion 112 is provided). As shown in FIGS. 1A and 1B, in a state where the moving mechanism 10 is assembled, the convex portion 112 of the vibrating body 110 is biased toward the pressure receiving body 50 of the support 20, and a voltage is applied to the vibrating body 110 of the piezoelectric motor 100, thereby driving the table 30.

Figure 3A:
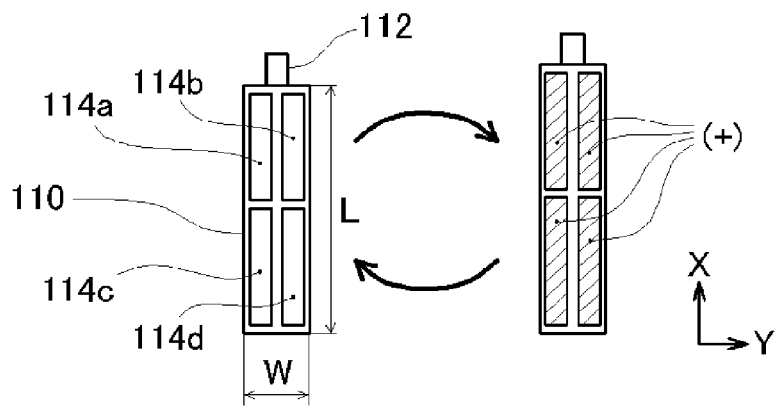
FIGS. 3A to 3C are explanatory views showing the operation principle of a piezoelectric motor.
Figure 3B:
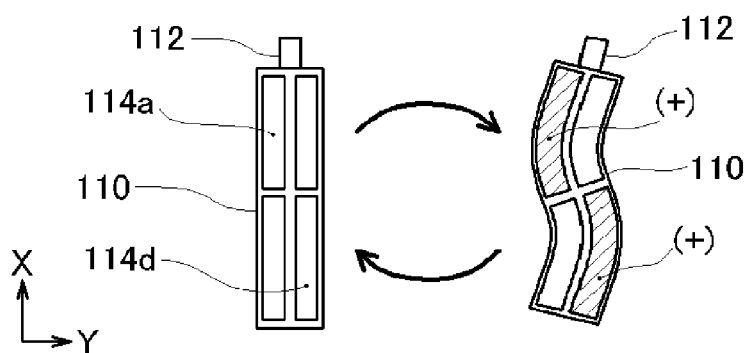
Figure 3C:
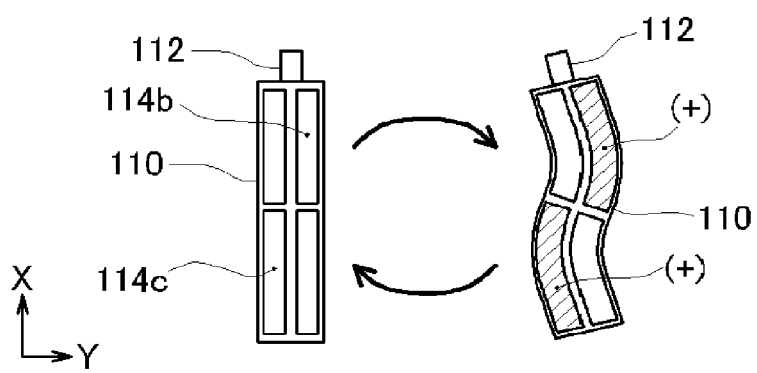

FIGS. 3A to 3C are explanatory views showing the operation principle of the piezoelectric motor 100. As shown in FIG. 3A, in the lateral surface on the front side of the vibrating body 110 provided in the piezoelectric motor 100, four rectangular front electrodes 114a to 114d are formed so as to bisect (in total, quadrisect) the lateral surface vertically and horizontally. When it is not necessary to distinguish among the four front electrodes 114a to 114d, these may be simply referred to as the front electrodes 114. Though not shown, in the lateral surface on the rear side of the vibrating body 110, a rear electrode is formed over substantially the entire lateral surface. The piezoelectric motor 100 operates such that, when a voltage is applied to the front electrodes 114 of the vibrating body 110 in a given period, the convex portion 112 of the vibrating body 110 generates elliptical motion. The reason why the convex portion 112 of the vibrating body 110 generates elliptical motion is as follows.

First, the vibrating body 110 including the piezoelectric material has a property to expand if a positive voltage is applied. Accordingly, as shown in FIG. 3A, if an operation to apply a positive voltage to all the four front electrodes 114 and to release the applied voltage is repeated, the vibrating body 110 repeats an operation to stretch in the longitudinal direction. In this way, the operation of the vibrating body 110 to repeatedly stretch in the longitudinal direction is referred to as "stretching vibration". Hereinafter, the direction (±X direction in the drawing) in which the vibrating body 110 is stretched is referred to as a "stretching direction". If a frequency at which a positive voltage is applied is changed, when a specific frequency is reached, the stretching amount rapidly increases, and a kind of resonance phenomenon occurs. The frequency (resonance frequency) at which resonance occurs due to the stretching vibration is determined by the physical property of the vibrating body 110 and the dimensions (width W, length L, thickness T) of the vibrating body 110.

As shown in FIG. 3B or 3C, the positive voltage is applied to a set of diagonally opposite two front electrodes 114 (a set of front electrode 114a and front electrode 114d or a set of front electrode 114b and front electrode 114c) in a given period. Then, the vibrating body 110 repeats an operation such that the tip portion in the longitudinal direction (a portion in which the convex portion 112 is provided) shakes the head thereof in a left-right direction of the drawing. For example, as shown in FIG. 3B, if the positive voltage is applied to the set of front electrode 114a and front electrode 114d in a given period, the vibrating body 110 repeats an operation such that the tip portion in the longitudinal direction moves in the right direction. As shown in FIG. 3C, if the positive voltage is applied to the set of front electrode 114b and front electrode 114c in a given period, the vibrating body 110 repeats an operation such that the tip portion in the longitudinal direction moves in the left direction. This operation of the vibrating body 110 is referred to as "bending vibration". Hereinafter, the direction (±Y direction in the drawing) in which the vibrating body 110 generates bending vibration is referred to as a "bending direction". Also in regard to the bending vibration, there is the resonance frequency which is determined by the physical property of the vibrating body 110 and the dimensions (width W, length L, thickness T) of the vibrating body 110. Accordingly, if the positive voltage is applied to the diagonally opposite two front electrodes 114 at the resonance frequency, the vibrating body 110 largely shakes the head thereof in the bending direction and generates vibration.

The resonance frequency of the stretching vibration shown in FIG. 3A and the resonance frequency of the bending vibration shown in FIG. 3B or 3C are determined by the physical property of the vibrating body 110 or the dimensions (width W, length L, thickness L) of the vibrating body 110. Accordingly, if the dimensions (width W, length L, thickness T) of the vibrating body 110 are appropriately selected, the two resonance frequencies can coincide with each other. If the voltage in the form of the bending vibration shown in FIG. 3B or 3C is applied to the vibrating body 110 at the resonance frequency, the bending vibration shown in FIG. 3B or 3C occurs, and the stretching vibration of FIG. 3A is induced by resonance. As a result, when a voltage is applied to the set of front electrode 114a and front electrode 114d in the form shown in FIG. 3B, the tip portion (the portion in which the convex portion 112 is provided) of the vibrating body 110 performs an operation (elliptical motion) to draw an ellipse in a clockwise direction in the drawing. When a voltage is applied to the set of front electrode 114b and front electrode 114c in the form shown in FIG. 3C, the tip portion of the vibrating body 110 performs an elliptical motion in a counterclockwise direction in the drawing. In the above description, a case where the positive voltage is applied to the vibrating body 110 has been described. However, a piezoelectric material is also deformed when a negative voltage is applied. Accordingly, a negative voltage may be applied to the vibrating body 110 to generate bending vibration (and stretching vibration), or an alternating voltage in which a positive voltage and a negative voltage are repeated may be applied to generate bending vibration (and stretching vibration). In the above description, a case where the voltage at the resonance frequency is applied has been described. However, it should be understood that a voltage which has a waveform including the resonance frequency is applied, and for example, a pulsed voltage may be applied.

The piezoelectric motor 100 drives the table 30 using the elliptical motion. That is, as shown in FIGS. 1A and 1B, the piezoelectric motor 100 generates the elliptical motion in a state where the short direction (bending direction) of the vibrating body 110 is fixed to the table 30 side in conformity with the moving direction, and the convex portion 112 of the vibrating body 110 is biased toward the pressure receiving body 50 of the support 20. Then, the convex portion 112 repeats an operation to move toward one side of the bending direction while being biased toward the pressure receiving body 50 when the vibrating body 110 expands and to return to the original position in a state of being away from the pressure receiving body 50 when the vibrating body 110 contracts. As a result, the table 30 moves toward the other side of the bending direction (moving direction) with respect to the support 20 by a frictional force which acts between the pressure receiving body 50 and the convex portion 112.

As apparent from the operation principle of the piezoelectric motor 100 described above, the piezoelectric motor 100 fixed to the table 30 side should be in a state where the convex portion 112 of the vibrating body 110 is biased toward the support 20 side (pressure receiving body 50). As a result, the table 30 receives a reaction force of a force (biasing force) which biases the convex portion 112 toward the pressure receiving body 50, whereby backlash occurs in the table 30 by the reaction force. Accordingly, in the moving mechanism 10 of this example, the convex portion 112 of the vibrating body 110 is biased as follows, thereby suppressing backlash of the table 30.

Figure 4:
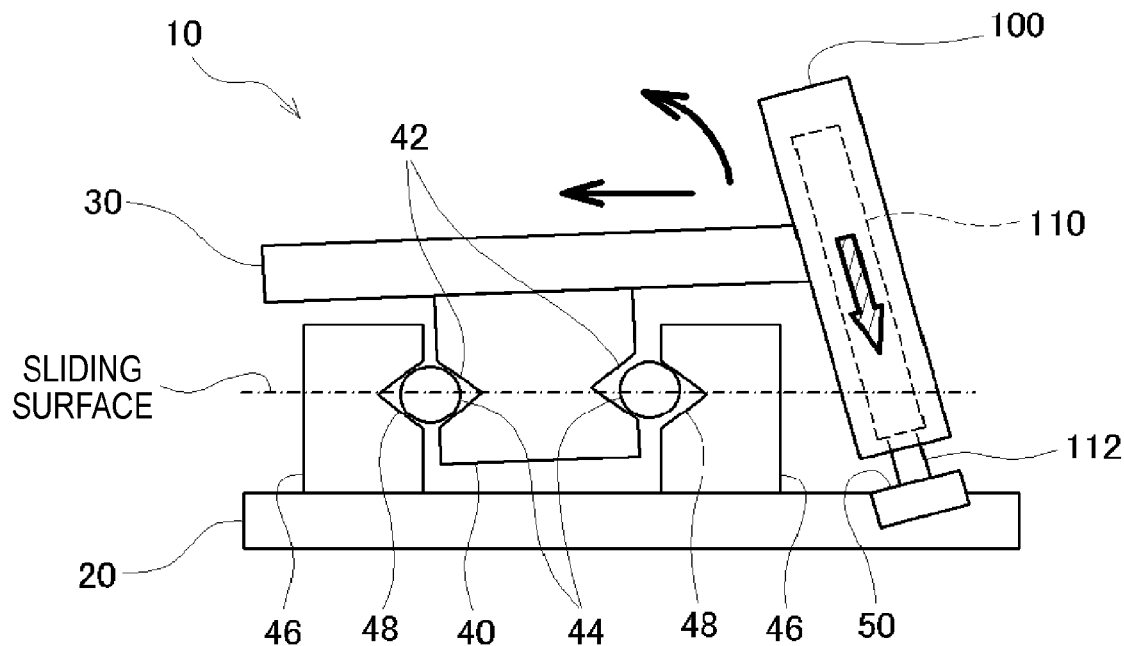
FIG. 4 is a sectional view of the moving mechanism of this example taken along a plane perpendicular to a moving direction.

FIG. 4 is a sectional view of the moving mechanism 10 of this example taken along a plane perpendicular to the moving direction. As described above, a plurality of balls 44 are inserted between the inner grooves 42 formed in the guide rail 40 on the table 30 side and the outer grooves 48 formed in the rail receivers 46 on the support 20 side, and two rows of ball guides parallel to the moving direction are formed between the support 20 and the table 30 by the plurality of balls 44. The plurality of balls 44 roll along the two rows of ball guides, whereby the table 30 moves smoothly with respect to the support 20. Hereinafter, a plane including the two rows of ball guides is referred to as a "moving surface". For smooth rolling of the balls 44, a slight allowance (clearance) is provided between the balls 44 and the inner grooves 42 or the outer grooves 48.

In the piezoelectric motor 100 which is attached to the lateral surface of the table 30, the short direction (bending direction) of the internal vibrating body 110 conforms to the moving direction, and the upper end side (a side opposite to the side on which the convex portion 112 is provided) is fixed obliquely toward the table 30 side. The vibrating body 110 is biased in the longitudinal direction (stretching direction) by the biasing spring 120, and the convex portion 112 is biased toward the pressure receiving body 50 of the support 20. As a result, the direction (biasing direction) in which the convex portion 112 of the vibrating body 110 is biased toward the pressure receiving body 50 is perpendicular to the moving direction and is inclined at a predetermined angle (in the illustrated example, 75 degrees) with respect to the moving surface.

The pressure receiving body 50 of this example is formed to have a substantially rectangular parallelepiped shape and is provided or buried in the support 20 in a state where the upper surface (the surface with which the convex portion 112 of the vibrating body 110 comes into contact) is perpendicular to the biasing direction. Accordingly, there is no case where the position of the pressure receiving body 50 is shifted, and a frictional force can be efficiently generated between the convex portion 112 and the pressure receiving body 50. In addition, in the moving mechanism 10 of this example, while the support 20 is formed of a plastic material, the pressure receiving body 50 is formed of a material, such as a ceramic material or a metal material, having a hardness that is higher than that of a plastic material. As a result, it is possible to suppress abrasion of the pressure receiving body 50 by a frictional force which acts between the convex portion 112 and the pressure receiving body 50.

The table 30 receives a reaction force in an opposite direction to the biasing direction when the convex portion 112 of the vibrating body 110 is biased toward the pressure receiving body 50. The reaction force includes a component in the left direction of the drawing parallel to the moving surface and a component in the upper direction of the drawing perpendicular to the moving surface. The table 30 receives the reaction force parallel to the moving surface, whereby in the ball guide on the side away from the piezoelectric motor 100 (the left side of the drawing) of the two rows of ball guides, the allowance (clearance) between the balls 44 and the inner and outer grooves 42 and 48 is reduced or clogged, and the balls 44 are pinched between the inner groove 42 and the outer groove 48.

In the ball guide on the side near the piezoelectric motor 100 (the right side of the drawing), while the clearance between the inner groove 42 and the outer groove 48 is extended, the table 30 receives the reaction force perpendicular to the moving surface, whereby a moment which allows the upward rotation of the table 30 with the ball guide having the reduced or clogged allowance on the left side of the drawing as an axis is generated, and the balls 44 are pinched between the lower end of the inner groove 42 and the upper end of the outer groove 48.

As described above, in the moving mechanism 10 of this example, the convex portion 112 of the vibrating body 110 is biased obliquely with respect to the moving surface, whereby the clearance between the balls 44 and the inner and outer grooves 42 and 48 of one ball guide of the two rows of ball guides can be reduced or clogged, and a rotational moment is generated with one ball guide as an axis to pinch the balls 44 between the inner groove 42 and the outer groove 48 in the other ball guide. As a result, it is possible to suppress backlash of the table 30.

In the moving mechanism 10 of this example, a position where the table 30 receives the reaction force is further away from the ball guide on the right side of the drawing (the ball guide on the side on which the clearance between the inner groove 42 and the outer groove 48 is extended) with respect to the ball guide on the left side of the drawing as an axis of rotation (the ball guide on the side on which the clearance between the balls 44 and the inner and outer grooves 42 and 48 is reduced or clogged), and a large rotational moment is generated. As a result, even if an external force, such as a weight, is applied to the table 30, it is difficult for backlash to occur in the table 30.

Figure 5:
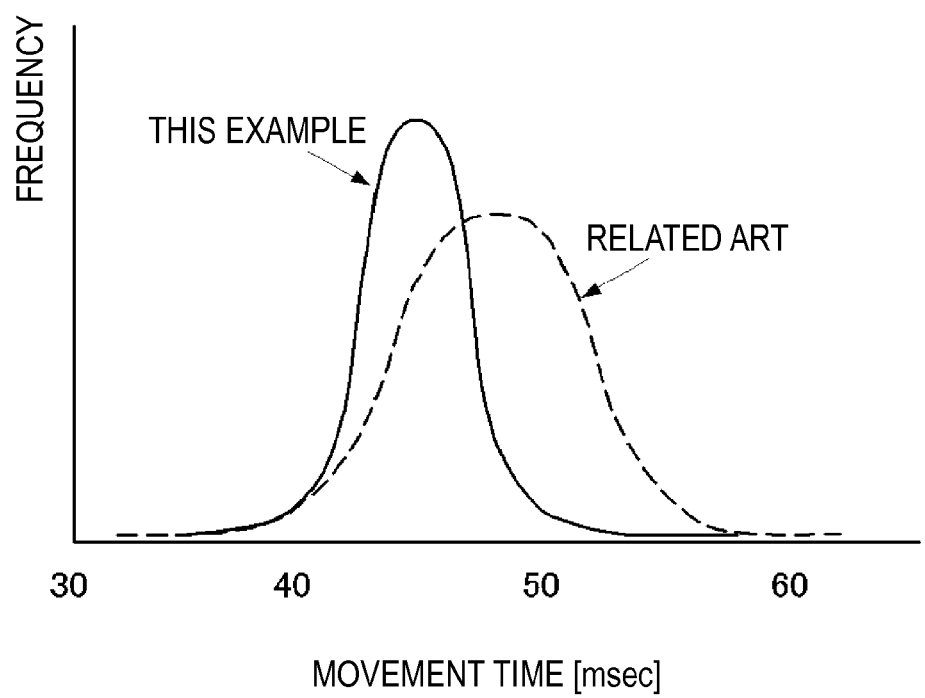
FIG. 5 is an explanatory view conceptually showing the suppression of backlash of a table by the moving mechanism of this example.

FIG. 5 is an explanatory view conceptually showing the suppression of backlash of the table 30 by the moving mechanism 10 of this example. First, the table 30 is moved with respect to the support 20, and the piezoelectric motor 100 is controlled such that the table 30 is positioned at a predetermined position (a position of 200 μm from a starting point). At this time, when the table 30 passes through the predetermined position, the table 30 is moved in an opposite direction, and a movement time necessary until an error from the predetermined position falls within a predetermined range (±3 μm) is measured. This moving operation of the table 30 is repeated, and the relationship between the movement time and the number (frequency) of times of movement which requires the movement time is shown in FIG. 5. A solid line in the graph represents a case where the moving operation is performed by the moving mechanism 10 of this example, and a dashed line in the graph represents a case as a comparative example where the moving operation is performed by the moving mechanism 10 in which the biasing direction (the direction in which the convex portion 112 of the vibrating body 110 is biased toward the pressure receiving body 50) is perpendicular to the moving surface. In the moving mechanism 10 of this example in which the biasing direction is inclined with respect to the moving surface, backlash of the table 30 is suppressed, whereby variation (deviation) in the movement time necessary for positioning the table 30 is small compared to the comparative example.

Hereinafter, a modification of the moving mechanism 10 of this example will be described. In the description of the modification, the same constituent portions as the foregoing example are represented by the same reference numerals as those described in the foregoing example, and their detailed description will not be repeated.

Figure 6:
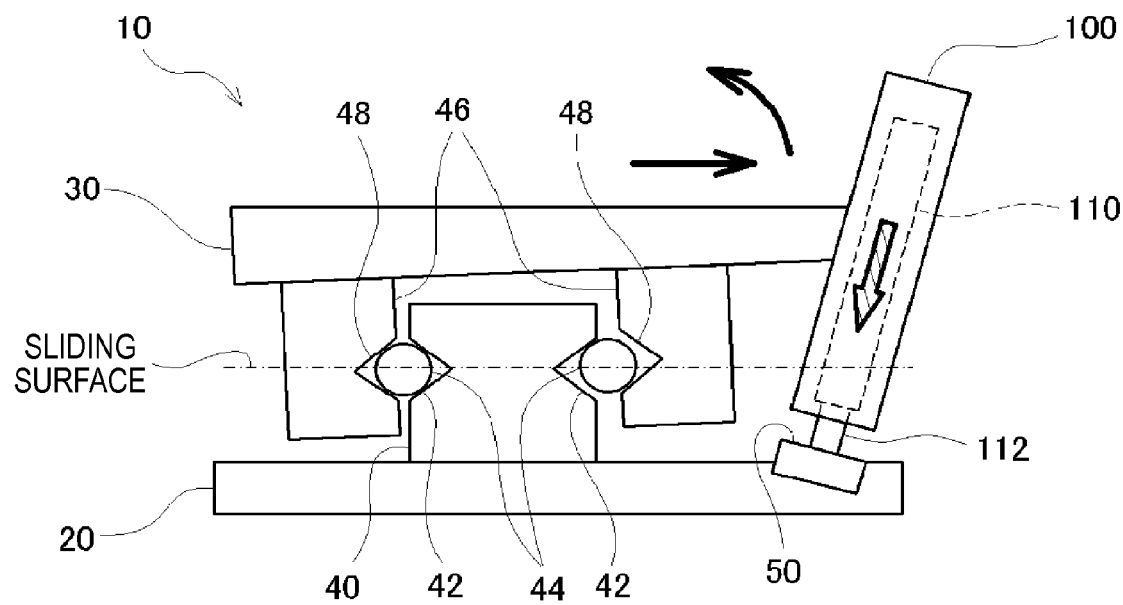
FIG. 6 is a sectional view showing the configuration of a moving mechanism of a first modification.

FIG. 6 is a sectional view showing the configuration of a moving mechanism 10 of a first modification. In a moving mechanism 10 of the first modification, a guide rail 40 is uprightly provided from the upper surface (the surface facing the table 30) of the support 20, and a pair of rail receivers 46 with the guide rail 40 pinched from both sides is vertically provided from the lower surface (the surface facing the support 20) of the table 30. A plurality of balls 44 are inserted between inner grooves 42 formed in both lateral surfaces of the guide rail 40 and outer grooves 48 formed in the inner wall surfaces of the rail receivers 46 to form two rows of ball guides. The inner grooves 42 of the first modification correspond to "first grooves", and the outer grooves 48 of the first modification correspond to "second grooves".

In a piezoelectric motor 100 which is attached to the lateral surface of the table 30, the upper end side (a side opposite to the side on which the convex portion 112 is provided) is fixed obliquely toward the side opposite to the table 30, and a direction (biasing direction) in which the convex portion 112 of the vibrating body 110 is biased toward the pressure receiving body 50 is inclined with respect to the moving surface including the two rows of ball guides. The pressure receiving body 50 is provided or buried in the support 20 such that the upper surface thereof is perpendicular to the biasing direction.

The table 30 receives a reaction force in an opposite direction to the biasing direction of the convex portion 112 of the vibrating body 110, and the reaction force includes a component in the right direction of the drawing parallel to the moving surface and a component in the upper direction of the drawing perpendicular to the moving surface. The clearance between the balls 44 and the inner and outer grooves 42 and 48 of the ball guide on the side (the left side of the drawing) away from the piezoelectric motor 100 of the two rows of ball guides is reduced or clogged by the reaction force parallel to the moving surface, a moment which allows the upward rotation of the table 30 with the ball guide on the left side of the drawing as an axis is generated by the reaction force perpendicular to the moving surface, and the balls 44 are pinched between the upper end side of the inner groove 42 and the lower end side of the outer groove 48 even in the ball guide on the side (the right side of the drawing) near the piezoelectric motor 100. As a result, it is possible to suppress backlash of the table 30.

The upper surface (the surface on the side opposite to the surface facing the support 20) of the table 30 of the first modification is inclined with respect to the lower surface of the table 30 by a rotation amount so as to be parallel to the support 20 in a state where the table 30 is rotated by a rotational moment. Accordingly, it is possible to maintain the horizontal state of an object which is placed on the upper surface of the table 30.

Figure 7:
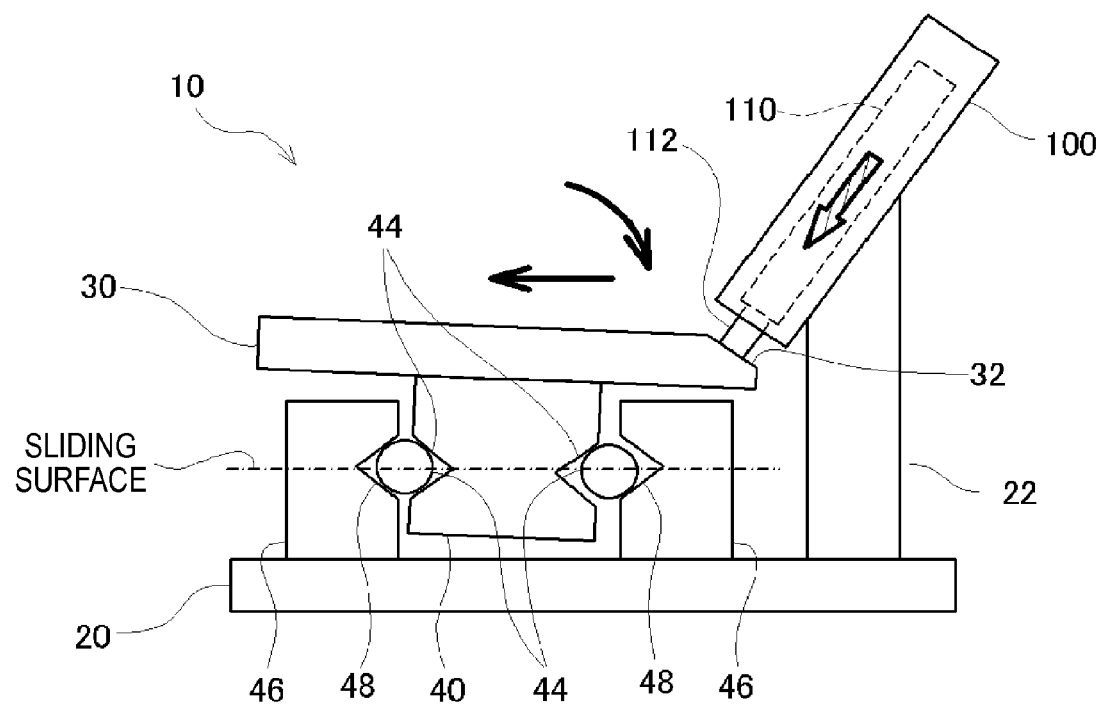
FIG. 7 is a sectional view showing the configuration of a moving mechanism of a second modification.

FIG. 7 is a sectional view showing the configuration of a moving mechanism 10 of a second modification. Although in the foregoing example, the piezoelectric motor 100 is fixed to the table 30 side, and the convex portion 112 of the vibrating body 110 is biased toward the support 20, in the moving mechanism 10 of the second modification, the piezoelectric motor 100 is fixed to the support 20 side, and the convex portion 112 of the vibrating body 110 is biased toward the table 30 side.

As shown in FIG. 7, the piezoelectric motor 100 of the second modification is attached to a column 22 which is uprightly provided from the upper surface (the surface facing the table 30) of the support 20, and the upper end side (the side opposite to the side on which the convex portion 112 is provided) is fixed obliquely toward the opposite side of the table 30. In a vibrating body 110 which is provided or embedded in the piezoelectric motor 100, the convex portion 112 is biased toward the upper surface (the surface on the side opposite to the surface facing the support 20) of the table 30 by the biasing force of the biasing spring 120, and the direction (biasing direction) in which the convex portion 112 is biased is inclined with respect to the moving surface. A pressure receiving surface 32 which is perpendicular to the biasing direction is formed at a position of the upper surface of the table 30 to which the convex portion 112 is biased.

In this way, the table 30 of the second modification directly receives the biasing force of the convex portion 112 of the vibrating body 110. The biasing force includes a component in the left direction of the drawing parallel to the moving surface and a component in the lower direction of the drawing perpendicular to the moving surface. The clearance between the balls 44 and the inner and outer grooves 42 and 48 of the ball guide on the side (the left side of the drawing) away from the piezoelectric motor 100 of the two rows of ball guides is reduced or clogged by the force parallel to the moving surface, a moment which allows the downward rotation of the table 30 with the ball guide on the left side of the drawing as an axis is generated by the force perpendicular to the moving surface, and the balls 44 are pinched between the inner groove 42 and the outer groove 48 even in the ball guide on the side (the right side of the drawing) near the piezoelectric motor 100. As a result, it is possible to suppress backlash of the table 30.

Figure 8A:
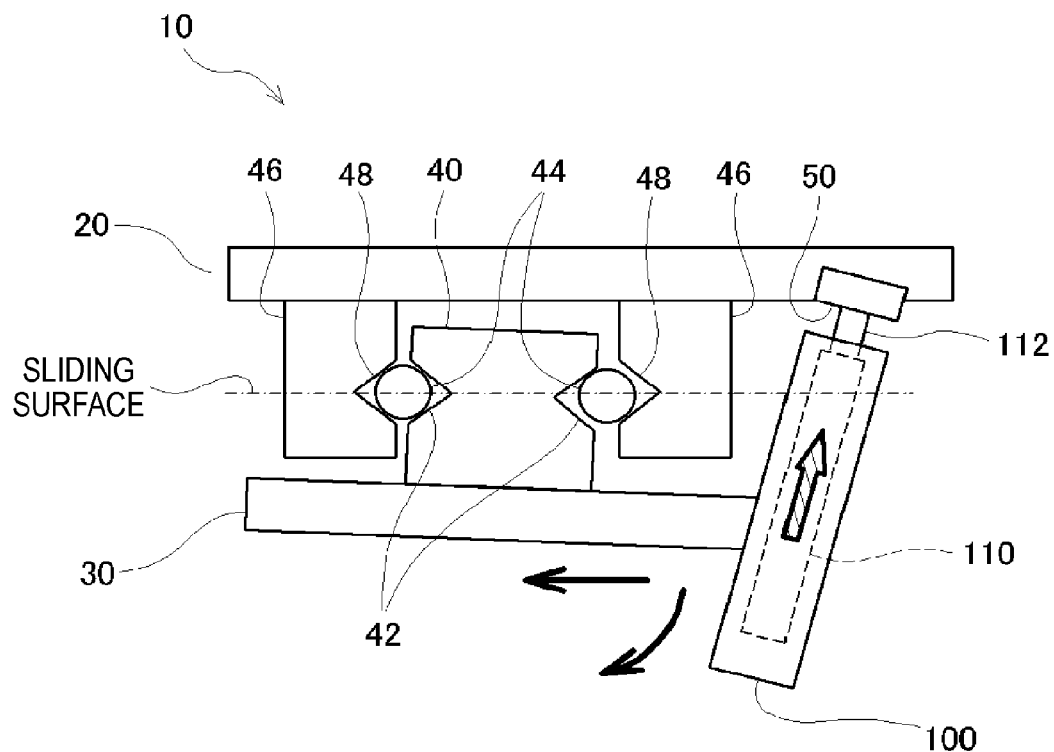
FIGS. 8A and 8B are sectional views showing the configuration of a moving mechanism of a third modification.
Figure 8B:
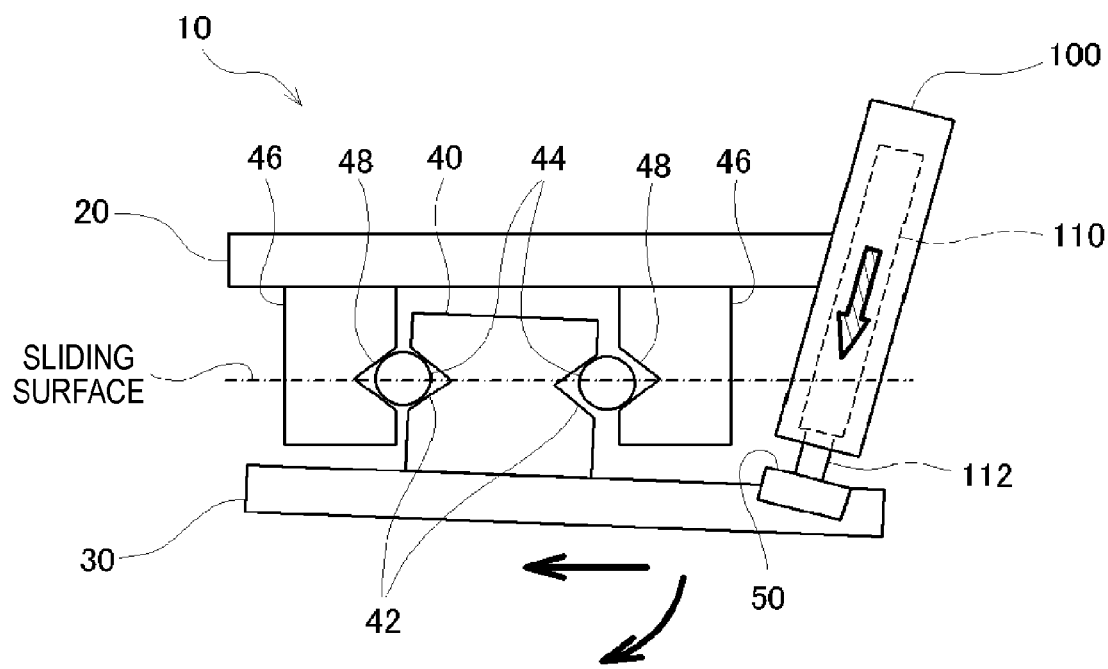

FIGS. 8A and 8B are sectional views showing the configuration of a moving mechanism 10 of a third modification. Although in the foregoing example, the table 30 is provided above the support 20, in the moving mechanism 10 of the third modification, the table 30 is provided below the support 20.

FIG. 8A shows a state where the moving mechanism 10 (see FIG. 4) of the example is vertically reversed, and the table 30 hangs from the support 20. In a piezoelectric motor 100 which is attached to the lateral surface of the table 30, the lower end side (the side opposite to the side on which the convex portion 112 is provided) is fixed obliquely with respect to the table 30 side, and the direction (biasing direction) in which the convex portion 112 of the vibrating body 110 is biased toward the pressure receiving body 50 is inclined with respect to the moving surface including the two rows of ball guides. The table 30 receives a reaction force in the opposite direction to the biasing direction of the convex portion 112 of the vibrating body 110, and the reaction force includes a component in the left direction of the drawing parallel to the moving surface and a component in the lower direction of the drawing perpendicular to the moving surface. The clearance between the balls 44 and the inner and outer grooves 42 and 48 of the ball guide on the side (the left side of the drawing) away from the piezoelectric motor 100 of the two rows of ball guides is reduced or clogged by the force parallel to the moving surface, a moment which allows the downward rotation of the table 30 with the ball guide on the left side of the drawing as an axis is generated by the force perpendicular to the moving surface, and the balls 44 are pinched between the inner groove 42 and the outer groove 48 even in the ball guide on the side (the right side of the drawing) near the piezoelectric motor 100. As a result, it is possible to suppress backlash of the table 30.

As shown in FIG. 8A, in the configuration in which the table 30 hangs from the support 20, since the load of the table 30 is added to the rotational moment and acts in a direction in which the balls 44 are strongly pinched between the inner groove 42 and the outer groove 48, it is suitable for suppressing backlash of the table 30.

FIG. 8B shows a configuration as a different example of FIG. 8A in which the piezoelectric motor 100 is fixed to the support 20 side, and the convex portion 112 of the vibrating body 110 is biased toward the table 30 side. In a piezoelectric motor 100 which is attached to the lateral surface of the support 20, the upper end side (the side opposite to the side on which the convex portion 112 is provided) is fixed obliquely toward the opposite side of the support 20, and the direction (biasing direction) in which the convex portion of the vibrating body 110 is biased toward the pressure receiving body 50 provided in the upper surface (the surface facing the support 20) of the table 30 is inclined with respect to the moving surface. The table 30 receives a biasing force of the convex portion 112 of the vibrating body 110, and the biasing force includes a component in the left direction of the drawing parallel to the moving surface and a component in the lower direction of the drawing perpendicular to the moving surface. The clearance between the balls 44 and the inner and outer grooves 42 and 48 of the ball guide on the side (the left side of the drawing) away from the piezoelectric motor 100 of the two rows of ball guides is reduced or clogged by the force parallel to the moving surface, a moment which allows the downward rotation of the table 30 with the ball guide on the left side of the drawing as an axis is generated by the force perpendicular to the moving surface, and the balls 44 are pinched between the inner groove 42 and the outer groove 48 even in the ball guide on the side (the right side of the drawing) near the piezoelectric motor 100. As a result, it is possible to suppress backlash of the table 30.

Figure 9A:
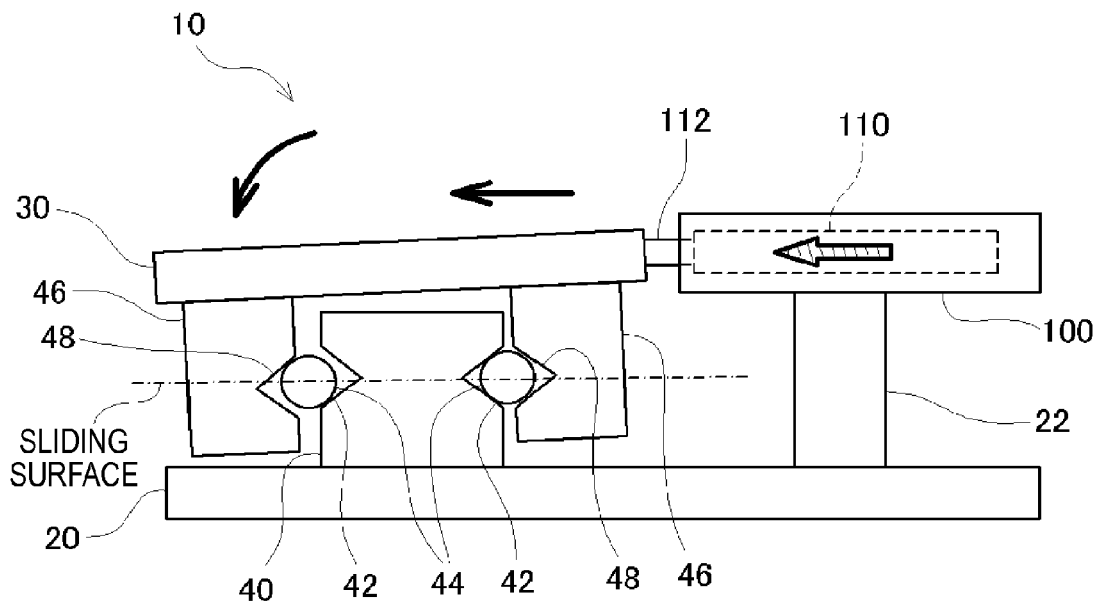
FIGS. 9A and 9B are sectional views showing the configuration of a moving mechanism of a fourth modification.
Figure 9B:
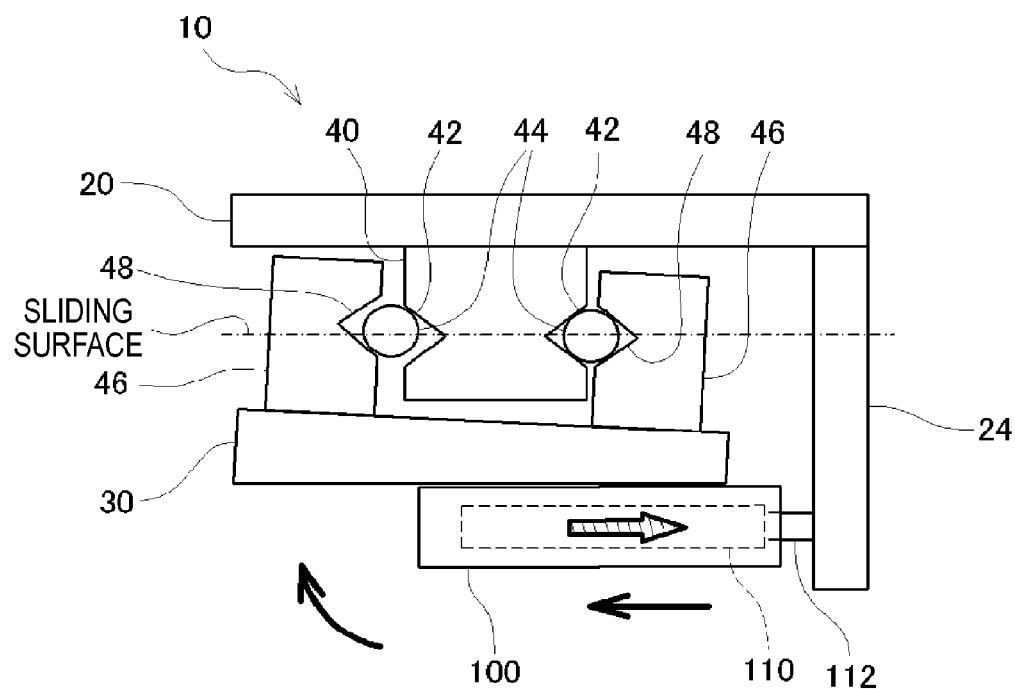

FIGS. 9A and 9B are sectional views showing the configuration of a moving mechanism 10 of a fourth modification. Although in the foregoing example, the convex portion 112 of the vibrating body 110 is biased obliquely with respect to the moving surface, in the moving mechanism 10 of the fourth modification, the convex portion 112 of the vibrating body 110 is biased parallel to the moving surface.

FIG. 9A shows a configuration in which the piezoelectric motor 100 is fixed to the support 20 side, and the convex portion 112 of the vibrating body 110 is biased toward the table 30 side. The piezoelectric motor 100 is attached to a column 22 which is uprightly provided from the upper surface (the surface facing the table 30) of the support 20, and the longitudinal direction (stretching direction) of the vibrating body 110 is fixed parallel to the moving surface. In the vibrating body 110, the convex portion 112 is biased toward the lateral surface of the table 30 by the biasing force of the biasing spring 120, and the direction (biasing direction) in which the convex portion 112 is biased is parallel to the moving surface.

The table 30 directly receives the biasing force of the convex portion 112 of the vibrating body 110, and the biasing force includes only a component in the left direction of the drawing parallel to the moving surface without including a component perpendicular to the moving surface. The table 30 receives the biasing force parallel to the moving surface, whereby in the ball guide on the side (the right side of the drawing) near the piezoelectric motor 100 of the two rows of ball guides, the clearance between the balls 44 and the inner and outer grooves 42 and 48 is reduced or clogged. While the table 30 does not receive the biasing force perpendicular to the moving surface, the table 30 receives the biasing force parallel to the moving surface at an upward position away from the moving surface, wherein a moment which allows the downward rotation of the table 30 with the ball guide on the right side of the drawing as an axis is generated, and the balls 44 are pinched between the inner groove 42 and the outer groove 48 even in the ball guide on the side (the left side of the drawing) away from the piezoelectric motor 100. As a result, it is possible to suppress backlash of the table 30.

FIG. 9B shows a configuration as a different example of FIG. 9A in which, in a state where the table 30 hangs from the support 20, the piezoelectric motor 100 is fixed to the table 30 side, and the convex portion 112 of the vibrating body 110 is biased toward the support 20 side. The piezoelectric motor 100 is attached to the lower surface (the surface on the side opposite to the surface facing the support 20) of the table 30. A vertical wall 24 is vertically provided from the lower surface (the surface facing the table 30) of the support 20, and, in the vibrating body 110, the convex portion 112 is biased toward the vertical wall 24 by the biasing force of the biasing spring 120. The table 30 receives the reaction force in the left direction of the drawing parallel to the moving surface at a downward position away from the moving surface. Accordingly, the clearance between the balls 44 and the inner and outer grooves 42 and 48 of the ball guide on the side (the right side of the drawing) near the piezoelectric motor 100 of the two rows of ball guides is reduced or clogged, a moment which allows the upward rotation of the table 30 with the ball guide on the right side of the drawing as an axis is generated, and the balls 44 are pinched between the inner groove 42 and the outer groove 48 even in the ball guide on the side (the left side of the drawing) away from the piezoelectric motor 100. As a result, it is possible to suppress backlash of the table 30.

Figure 10A:
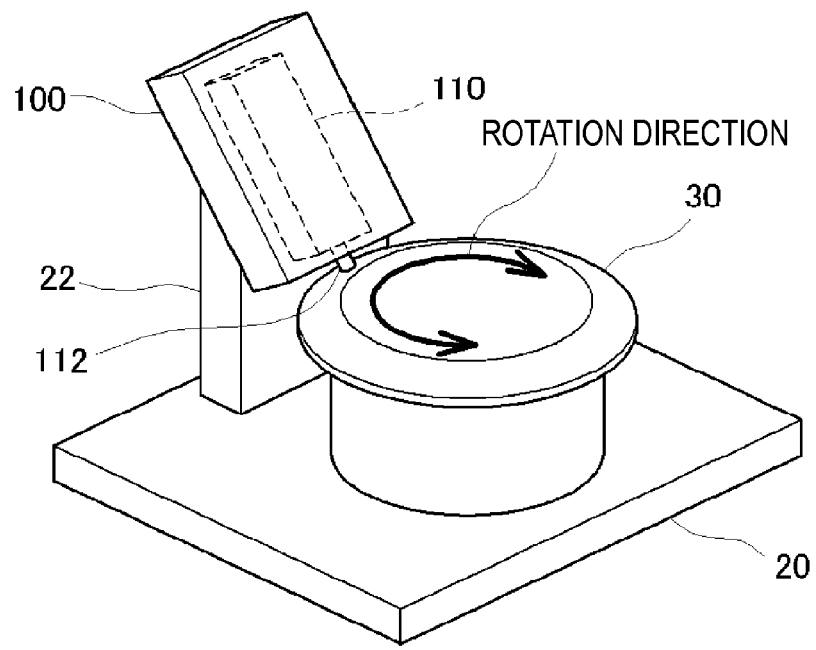
FIGS. 10A and 10B are explanatory views showing the configuration of a moving mechanism of a fifth modification.
Figure 10B:
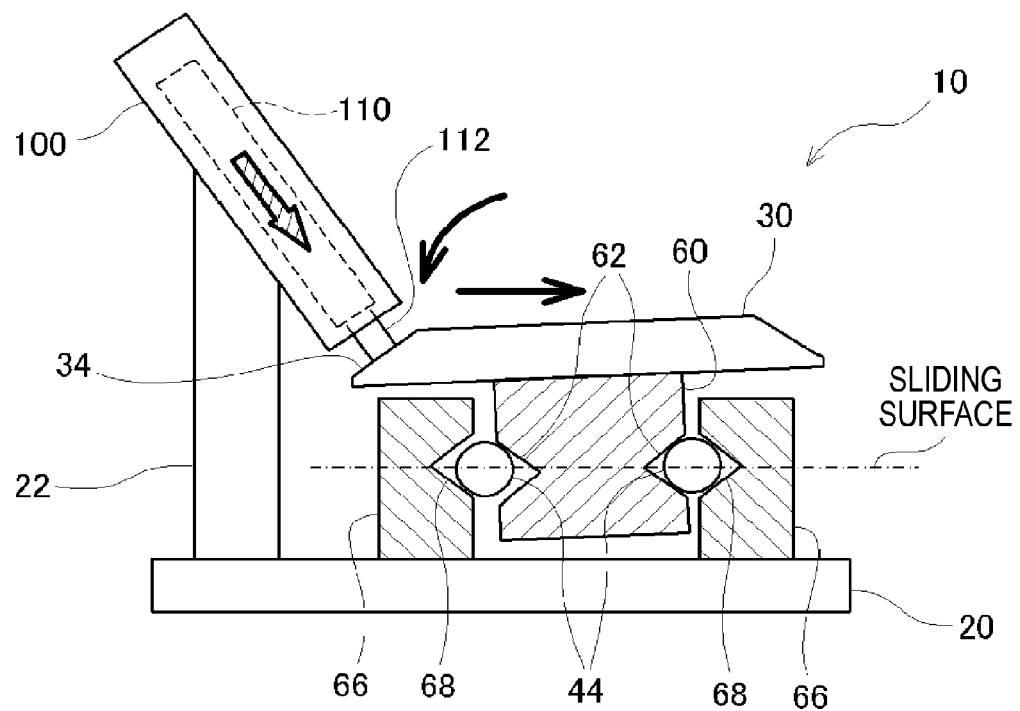

FIGS. 10A and 10B are explanatory views showing the configuration of a moving mechanism 10 of a fifth modification. FIG. 10A shows an appearance shape in perspective view, and FIG. 10B shows an internal structure in sectional view. Although in the foregoing example, the table 30 linearly moves with respect to the support 20 (the moving direction is a linear direction), in the moving mechanism 10 of the fifth modification, the table 30 rotationally moves with respect to the support 20.

As shown in FIG. 10A, the table 30 of the fifth modification is formed in a disc shape and is provided above the support 20. A piezoelectric motor 100 is attached to a column 22 which is uprightly provided from the upper surface (the surface facing the table 30) of the support 20, and in the vibrating body 110 which is provided or embedded in the piezoelectric motor 100, the convex portion 112 is biased toward the upper surface (the surface on the side opposite to the surface facing the support 20) of the table 30 by the biasing force of the biasing spring 120.

As shown in FIG. 10B, a cylindrical guide shaft 60 is vertically provided from the lower surface (the surface facing the support 20) of the table 30, and an inner groove 62 (second groove) having a V-shaped cross-section is formed in the outer circumferential surface of the guide shaft 60. A cylindrical shaft receiver 66 into which the guide shaft 60 is inserted is uprightly provided in the upper surface (the surface facing the table 30) of the support 20, and an outer groove 68 (first groove) which faces the inner groove 62 of the guide shaft 60 and has a V-shaped cross section is formed in the inner circumferential surface of the shaft receiver 66. A plurality of balls 44 are inserted between the inner groove 62 of the guide shaft 60 and the outer groove 68 of the shaft receiver 66, and the plurality of balls 44 form a ring-shaped ball guide between the support 20 and the table 30. The balls 44 roll along the inner groove 62 and the outer groove 68, whereby the table 30 rotationally moves smoothly with respect to the support 20.

In the piezoelectric motor 100 which is attached to the column 22 on the support 20 side, the upper end side (the side opposite to the side on which the convex portion 112 is provided) is fixed obliquely toward the side opposite to the table 30, and the direction (biasing direction) in which the convex portion 112 of the vibrating body 110 is biased toward the upper surface of the table 30 is inclined with respect to the moving surface including the ring-shaped ball guide. A pressure receiving surface 34 which is perpendicular to the biasing direction is formed at a position of the upper surface of the table 30 to which the convex portion 112 is biased.

The table 30 directly receives the biasing force of the convex portion 112 of the vibrating body 110, and the biasing force includes a component in the right direction of the drawing parallel to the moving surface and a component in the lower direction of the drawing perpendicular to the moving surface. In a portion of the ring-shaped ball guide on the side (the right side of the drawing) away from the piezoelectric motor 100, the clearance between the balls 44 and the inner and outer grooves 62 and 68 is reduced or clogged by the force parallel to the moving surface. In a portion of the ring-shaped ball guide on the side (the left side of the drawing) near the piezoelectric motor 100, while the clearance between the inner groove 62 and the outer groove 68 is extended, a moment which allows the downward rotation of the table 30 with the portion of the ball guide on the right side of the drawing as an axis is generated by the force perpendicular to the moving surface, and the balls 44 are pinched between the upper end side of the inner groove 62 and the lower end side of the outer groove 68. As a result, it is possible to suppress backlash of the table 30.

With the moving mechanism 10 of this example or the moving mechanism 10 of the modification, backlash of the table 30 can be suppressed to move the table 30 with high precision, whereby the moving mechanism can be suitably incorporated as a moving mechanism for the following devices.

Figure 11:
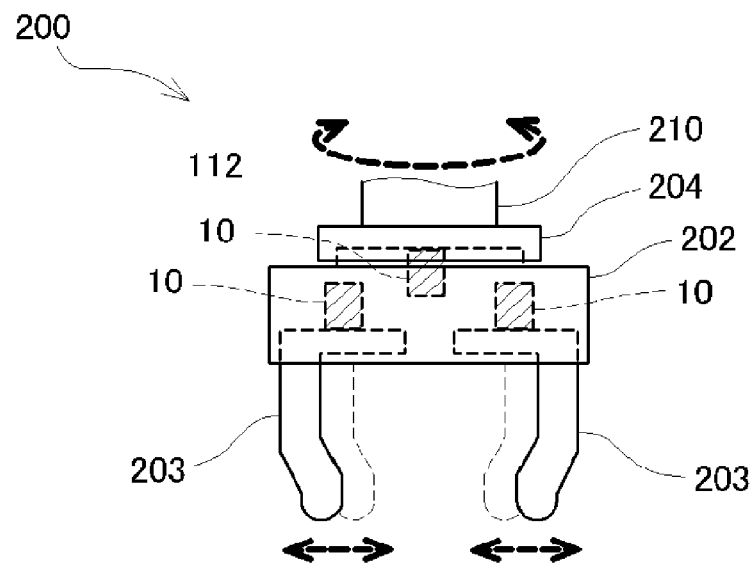
FIG. 11 is an explanatory view illustrating a robot hand in which a moving mechanism of this example or a modification is incorporated.

FIG. 11 is an explanatory view illustrating a robot hand 200 in which the moving mechanism 10 of this example or the modification is incorporated. In the illustrated robot hand 200, a plurality of finger portions 203 are uprightly provided from a base 202 and connected to an arm 210 through a wrist 204. A root portion of each finger portion 203 is movable inside the base 202, and a linear moving mechanism 10 is mounted in a state where the table 30 is fixed to the root portion of the finger portion 203. As a result, the moving mechanism 10 is operated (the table 30 is moved), whereby the finger portions 203 can be moved to hold an object. The rotational moving mechanism 10 of the fifth modification is mounted in the portion of the wrist 204. As a result, the moving mechanism 10 is operated, whereby the entire base 202 can be rotated.

Figure 12:
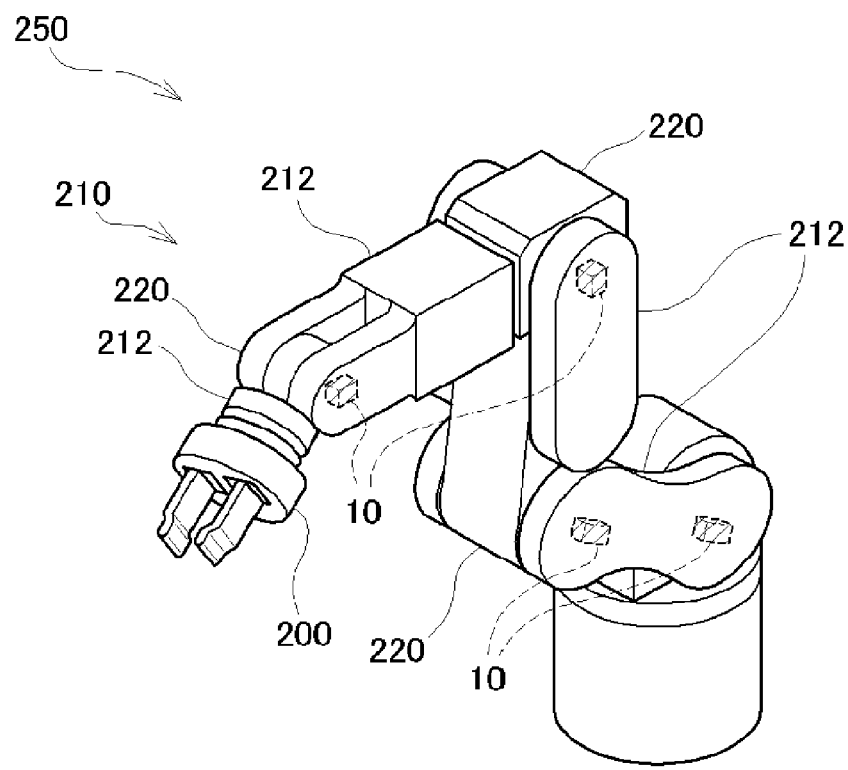
FIG. 12 is an explanatory view illustrating a single arm robot including a robot hand.

FIG. 12 is an explanatory view illustrating a single arm robot 250 including a robot hand 200 (hand portion). As shown in FIG. 12, the robot 250 has an arm 210 (arm portion) including a plurality of link portions 212 (link members) and joint portions 220 which connect these link portions 212 in a bendable state. The robot hand 200 is connected to the tip of the arm 210. Each joint portion 220 is provided with the rotational moving mechanism 10 of the fifth modification. As a result, the moving mechanism 10 is operated, whereby each joint portion 220 can be bent (rotated) by an arbitrary angle.

Figure 13:
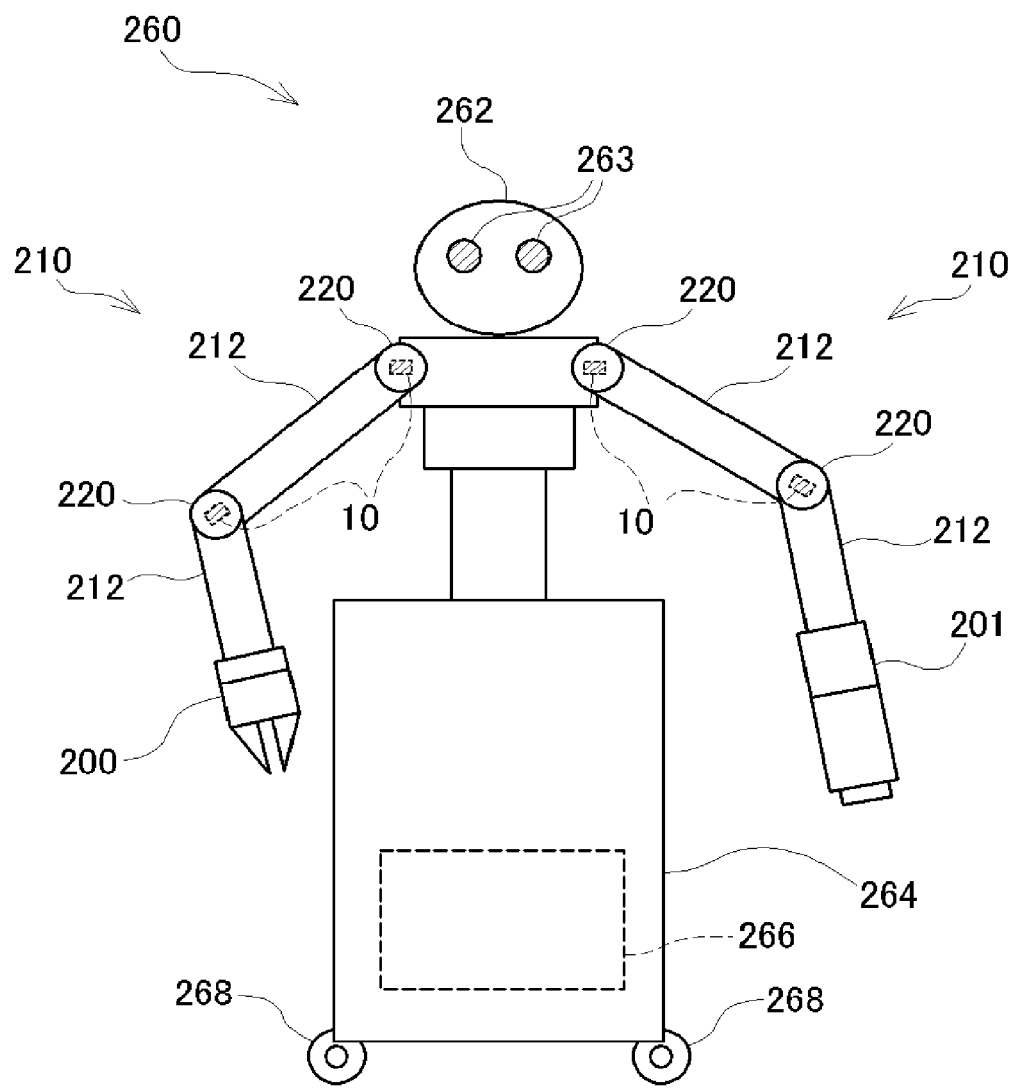
FIG. 13 is an explanatory view illustrating a double arm robot including a robot hand.

FIG. 13 is an explanatory view illustrating a double arm robot 260 including a robot hand 200. As shown in FIG. 13, the robot 260 has a plurality (in the illustrated example, two) of arms 210 including a plurality of link portions 212 and joint portions 220 which connect these link portions 212 in a bendable state. The robot hand 200 or a tool 201 (hand portion) is connected to the tip of the arm 210. A plurality of cameras 263 are mounted in a head portion 262, and a control unit 266 which controls overall operation is mounted inside a main body portion 264. The robot can be transported by casters 268 which are provided at the bottom surface of the main body portion 264. In the robot 260, each joint portion 220 is provided with the rotational moving mechanism 10 of the fifth modification. As a result, the moving mechanism 10 is operated, whereby each joint portion 220 can be bent (rotated) at an arbitrary angle.

Figure 14:
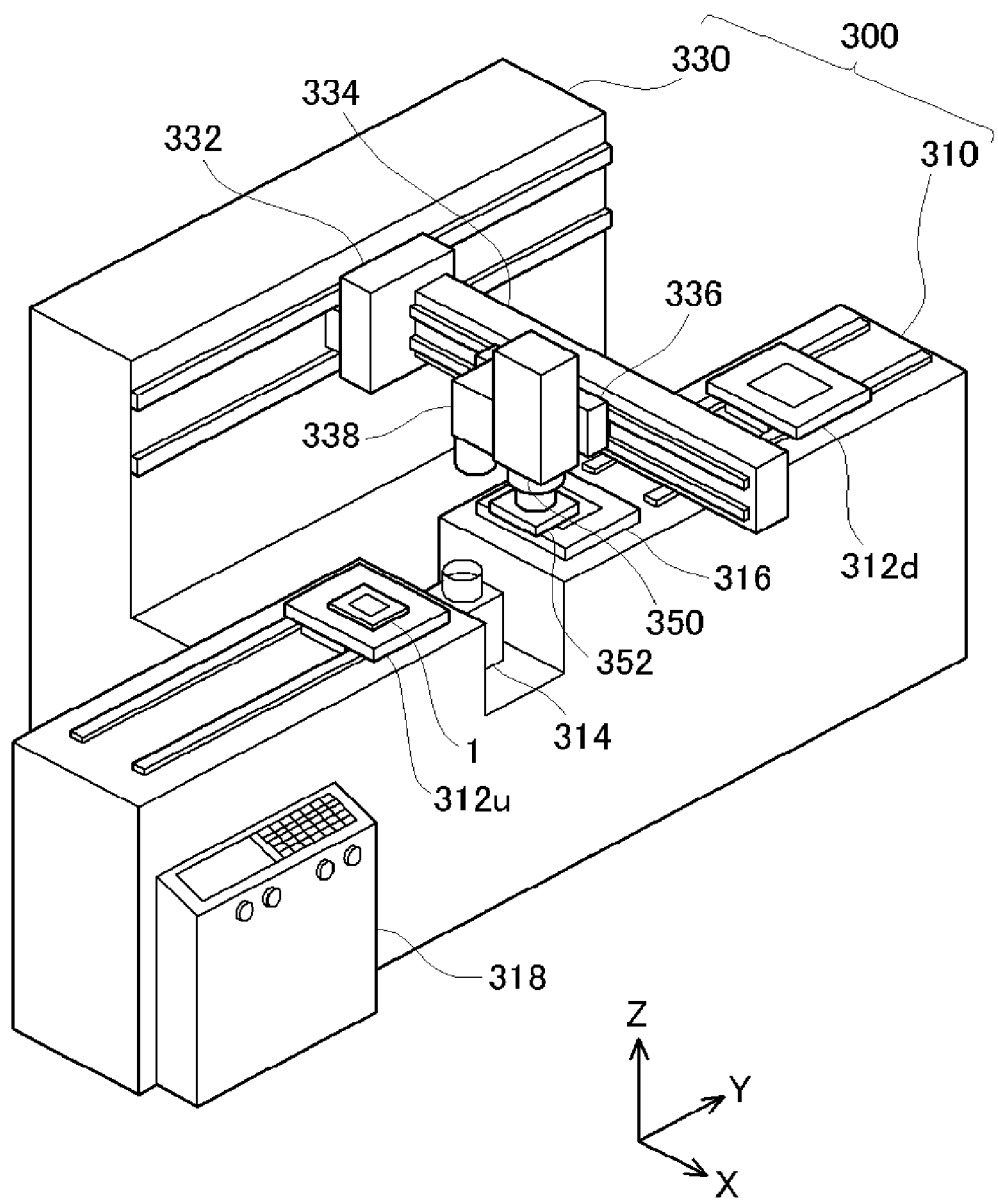
FIG. 14 is a perspective view illustrating an electronic component inspection device in which a moving mechanism of this example or a modification is incorporated.

FIG. 14 is a perspective view illustrating an electronic component inspection device 300 in which the moving mechanism 10 of this example or the modification is incorporated. The illustrated electronic component inspection device 300 broadly includes a base 310 and a support 330 uprightly provided on the lateral surface of the base 310. In the upper surface of the base 310 are provided an upstream-side stage 312u on which an electronic component 1 to be inspected is placed and transported, and a downstream-side stage 312d on which the inspected electronic component 1 is placed and transported. An imaging device 314 for confirming the posture of the electronic component 1 and an inspection member 316 (inspection unit) on which the electronic component 1 is set so as to inspect electrical characteristics are provided between the upstream-side stage 312u and the downstream-side stage 312d. Representative examples of the electronic component 1 include "semiconductors", "semiconductor wafers", "display devices, such as CLD and OLED", "crystal devices", "various sensors", "ink jet heads", "various MEMS devices", and the like.

In the support 330, a Y stage 332 is provided to move in a direction (Y direction) parallel to the upstream-side stage 312u and the downstream-side stage 312d of the base 310, and an arm portion 334 extends from the Y stage 332 in a direction (X direction) toward the base 310. An X stage 336 is provided in the lateral surface of the arm portion 334 to move in the X direction. In the X stage 336, an imaging camera 338 and a holding device 350 provided with a Z stage movable in the up-down direction (Z direction) are provided. A holding unit 352 which holds the electronic component 1 is provided at the tip of the holding device 350. A control device 318 which controls the overall operation of the electronic component inspection device 300 is provided in the front surface of the base 310. In this example, the Y stage 332 provided in the support 330, the arm portion 334, the X stage 336, and the holding device 350 correspond to an "electronic component transport device".

The electronic component inspection device 300 having the above configuration inspects the electronic component 1 in the following manner. First, the electronic component 1 to be inspected is placed on the upstream-side stage 312u and moved near the inspection member 316. Next, the Y stage 332 and the X stage 336 are driven to move the holding device 350 to a position directly above the electronic component 1 placed on the upstream-side stage 312u. At this time, the position of the electronic component 1 can be confirmed using the imaging camera 338. The holding device 350 is moved down using the Z stage provided in the holding device 350, if the electronic component 1 is held by the holding unit 352, the holding device 350 is moved onto the imaging device 314 directly, and the posture of the electronic component 1 is confirmed using the imaging device 314. Subsequently, the posture of the electronic component 1 is adjusted using a fine adjustment mechanism provided or embedded in the holding device 350. After the holding device 350 is moved onto the inspection member 316, the Z stage provided in the holding device 350 is driven to set the electronic component 1 on the inspection member 316. Since the posture of the electronic component 1 is adjusted using the fine adjustment mechanism in the holding device 350, the electronic component 1 can be set at a correct position of the inspection member 316. After the electrical characteristics of the electronic component 1 are inspected using the inspection member 316, the electronic component 1 is taken up from the inspection member 316 again, the Y stage 332 and the X stage 336 are driven to move the holding device 350 onto the downstream-side stage 312d, and the electronic component 1 is placed on the downstream-side stage 312d. Thereafter, the downstream-side stage 312d is driven to transport the inspected electronic component 1 to a predetermined position.

Figure 15:
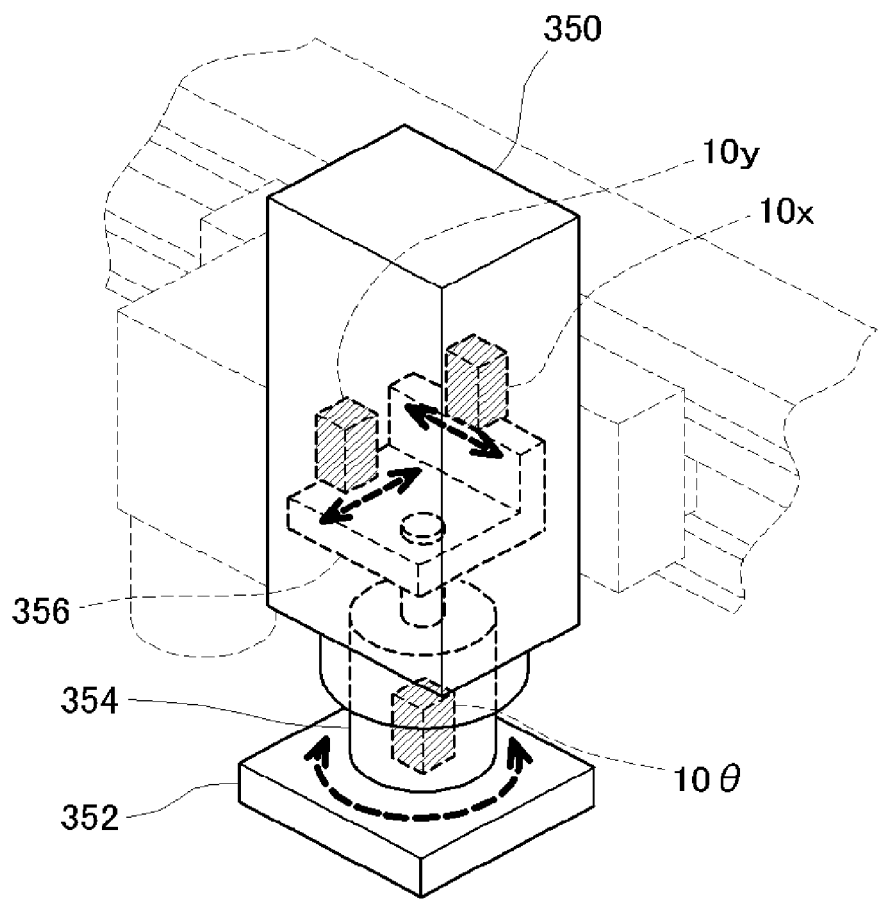
FIG. 15 is an explanatory view of a fine adjustment mechanism which is provided in a holding device.

FIG. 15 is an explanatory view of the fine adjustment mechanism provided or embedded in the holding device 350. As shown in FIG. 15, in the holding device 350, a rotation shaft 354 connected to the holding unit 352, and a fine adjustment plate 356 to which the rotation shaft 354 is rotatably attached are provided. The fine adjustment plate 356 can be moved in the X direction and the Y direction while being guided by a guide mechanism (not shown).

As indicated by hatching in FIG. 15, a rotational moving mechanism 10θ of the fifth modification is mounted in the rotation shaft 354. As a result, the moving mechanism 10θ is operated, whereby the rotation shaft 354 (and the holding unit 352) can be rotated by an arbitrary angle in a θ direction with high precision. In the fine adjustment plate 356, a linear moving mechanism 10x for an X direction and a linear moving mechanism 10y for a Y direction are provided, and the tables 30 are fixed to the surface of the fine adjustment plate 356. As a result, the moving mechanism 10x is operated, whereby the fine adjustment plate 356 (and the holding unit 352) can be moved in the X direction by an arbitrary distance with high precision. Similarly, the moving mechanism 10y is operated, whereby the fine adjustment plate 356 (and the holding unit 352) can be moved in the Y direction by an arbitrary distance with high precision. Accordingly, in the electronic component inspection device 300 of FIG. 14, the moving mechanism 10θ, the moving mechanism 10x, and the moving mechanism 10y are operated, thereby finely adjusting the posture of the electronic component 1 held by the holding unit 352.

Figure 16A:
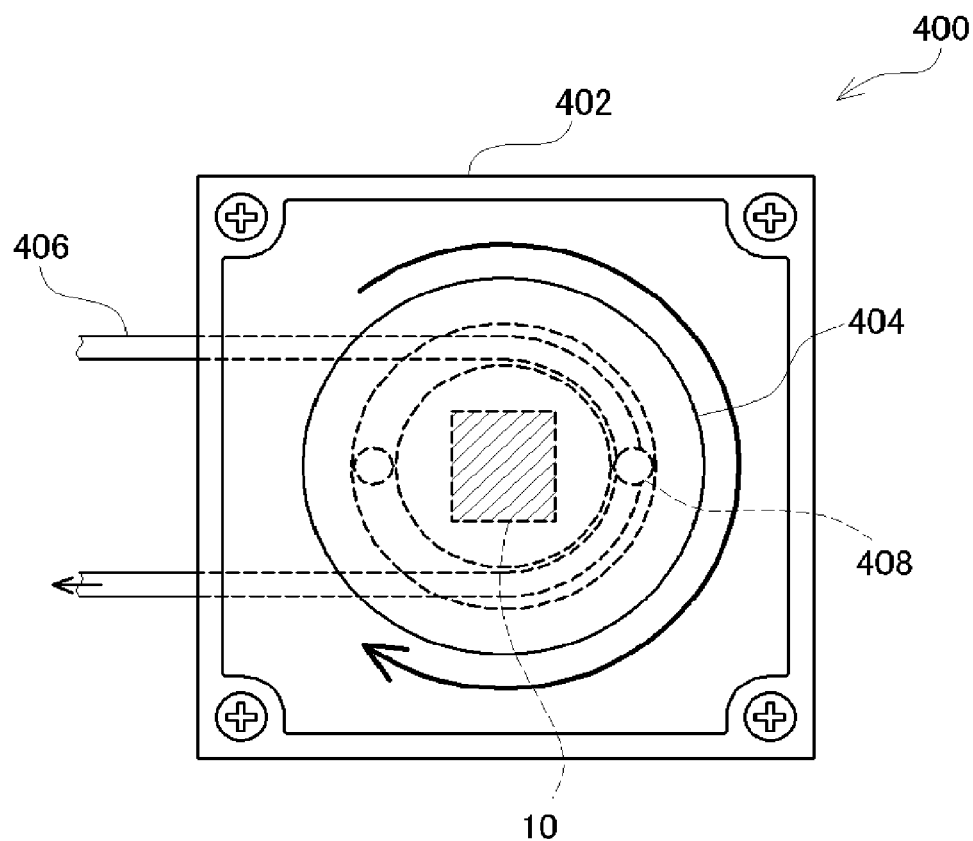
FIGS. 16A and 16B are explanatory views illustrating a liquid feed pump in which a moving mechanism of this example or a modification is incorporated.
Figure 16B:
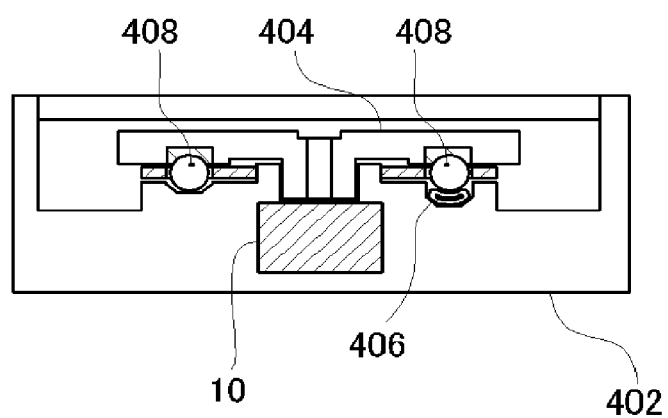

FIGS. 16A and 16B are explanatory views illustrating a liquid feed pump 400 in which the moving mechanism 10 of this example or the modification is incorporated. FIG. 16A is a plan view of the liquid feed pump 400 in top view, and FIG. 16B is a sectional view of the liquid feed pump 400 in side view. As shown in FIGS. 16A and 16B, in the liquid feed pump 400, a disc-like rotor 404 is provided rotatably in a rectangular case 402, and a tube 406 through which a liquid, such as a drug solution, circulates is pinched between the case 402 and the rotor 404. A part of the tube 406 is pressed by balls 408 (blocking portions) provided in the rotor 404 and blocked. As a result, if the rotor 404 rotates, since the positions at which the balls 408 press the tube 406 move, the liquid of the tube 406 is fed. If the rotational moving mechanism 10 of the fifth modification is provided in a state where the table 30 is coaxially fixed to the rotor 404, the moving mechanism 10 is operated to rotate the rotor 404. In this way, it becomes possible to feed an extremely slight amount of liquid with high precision.

Figure 17:
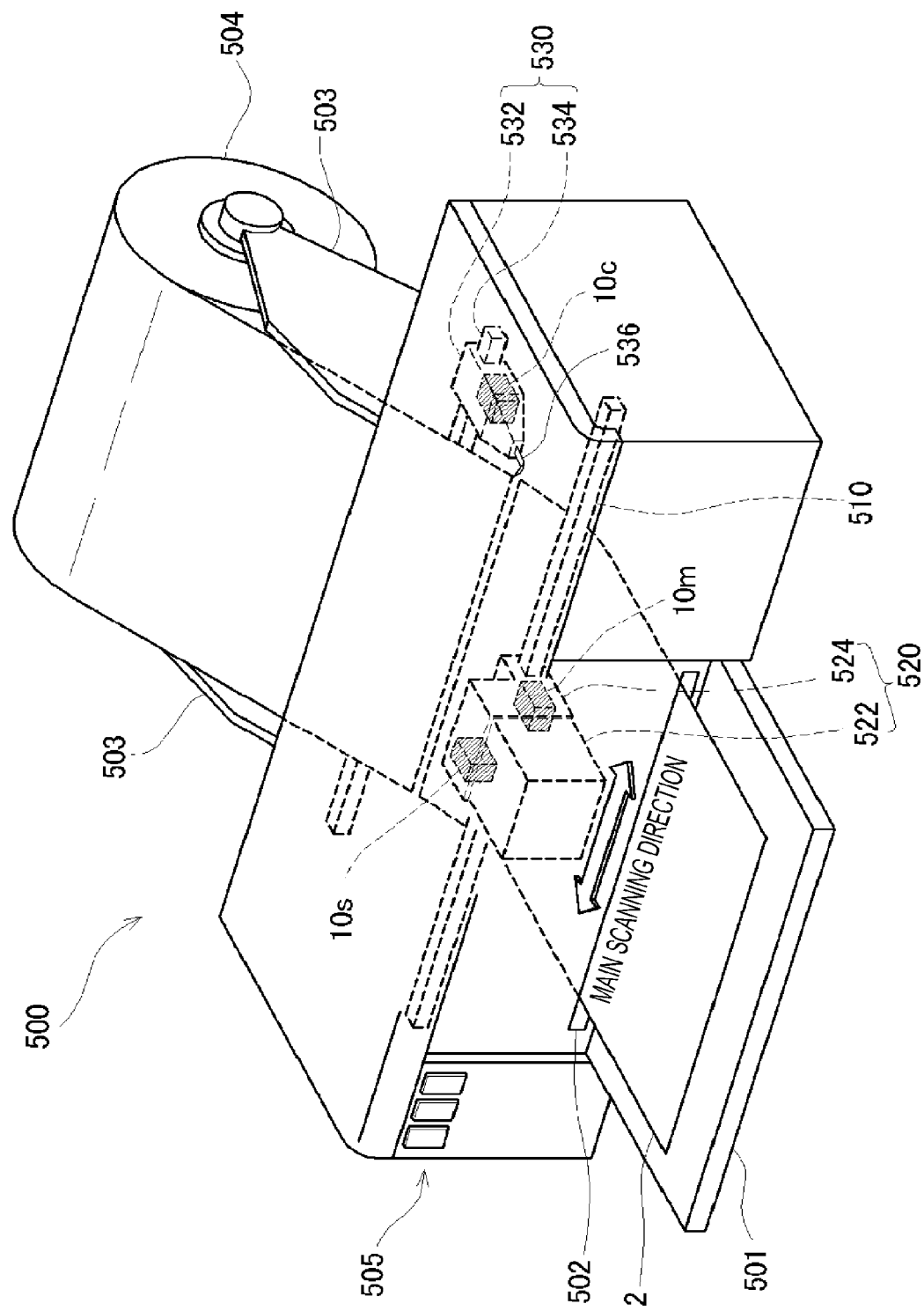
FIG. 17 is a perspective view illustrating a printing device in which a moving mechanism of this example or a modification is incorporated.

FIG. 17 is a perspective view illustrating a printing device 500 in which the moving mechanism 10 of this example or the modification is incorporated. The illustrated printing device 500 is a so-called ink jet printer which ejects ink onto the surface of a printing medium 2 to print an image. It is assumed that examples of the "image" which is printed by the printing device 500 include characters, figures, pictures, patterns, photographic video, and the like. The printing device 500 has a substantially boxlike appearance shape, and is provided with a sheet discharge tray 501, a discharge port 502, and a plurality of operating buttons 505 at the substantially center of the front surface. A feed tray 503 is provided in the rear surface. If the printing medium 2 is set in the feed tray 503 and the operating buttons 505 are operated, the printing medium 2 is drawn from the feed tray 503, an image is printed on the surface of the printing medium 2 inside the printing device 500, and then the printing medium 2 is discharged from the discharge port 502.

Inside the printing device 500 are provided a print head 520 which reciprocates in a main scanning direction on the printing medium 2, and a guide rail 510 which guides movement of the print head 520 in the main scanning direction. The illustrated print head 520 has a printing unit 522 which ejects ink onto the printing medium 2, and a scanning unit 524 which scans the print head 520 in the main scanning direction. A plurality of ejection nozzles are provided on the bottom side (the side facing the printing medium 2) of the printing unit 522, and ink can be ejected from the ejection nozzles toward the printing medium 2. Linear moving mechanisms 10m and 10s are mounted in the scanning unit 524. As a result, the moving mechanism 10m is operated, whereby the print head 520 can be moved in the main scanning direction. The moving mechanism 10s is operated, whereby the bottom side of the printing unit 522 can be moved close to the printing medium 2 or can be moved away from the printing medium 2. A cutting mechanism 530 for cutting roll paper 504 is also mounted in the printing device 500. The cutting mechanism 530 includes a cutter holder 534 which has a sheet cutter 536 mounted at the tip thereof, and a guide shaft 532 which passes through the cutter holder 534 and extends in the main scanning direction. A linear moving mechanism 10c is mounted in the cutter holder 534, if the moving mechanism 10c is operated, the cutter holder 534 moves in the main scanning direction along the guide shaft 532, and the sheet cutter 536 cuts the roll paper 504. The moving mechanism 10 may be used so as to paper-feed the printing medium 2.

Figure 18:
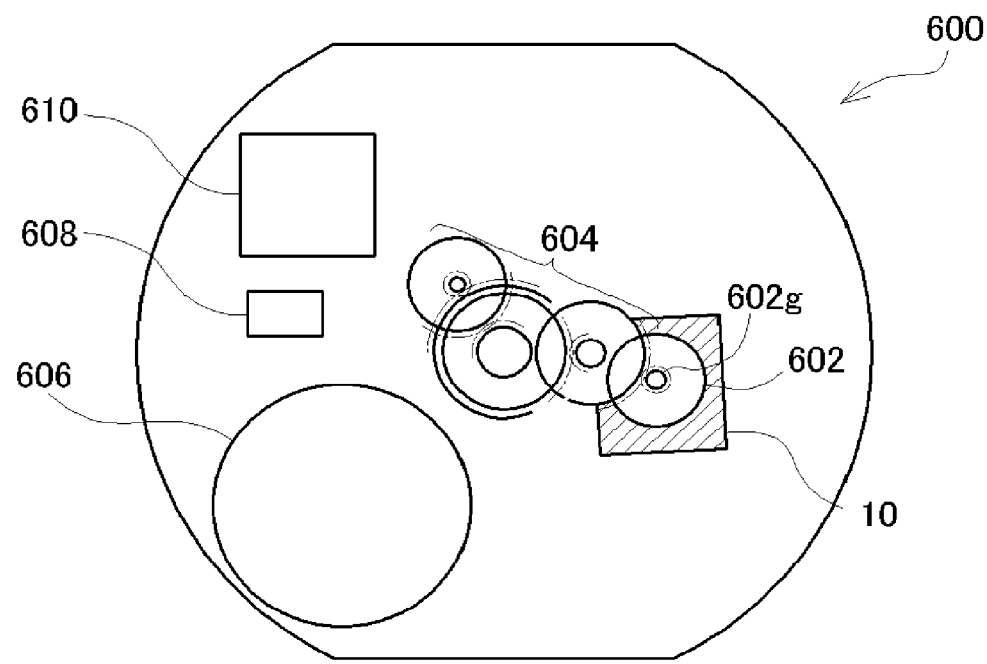
FIG. 18 is an explanatory view illustrating an electronic clock in which a moving mechanism of this example or a modification is incorporated.

FIG. 18 is an explanatory view illustrating the internal structure of an electronic clock 600 in which the moving mechanism 10 of this example is incorporated. FIG. 18 is a plan view when viewed from an opposite side (rear cover side) to a time display side of the electronic clock 600. Inside the electronic clock 600 illustrated in FIG. 18 are provided a disc-like rotating disc 602, a gear train 604 which transmits the rotation of the rotating disc 602 to an indicator (not shown) displaying the time, a moving mechanism 10 which rotationally moves the rotating disc 602, a power supply unit 606, a crystal chip 608, and an IC 610. The power supply unit 606, the crystal chip 608, and the IC 610 are mounted on a circuit board (not shown). The gear train 604 has a plurality of gears including a ratchet (not shown), and is arranged so as to sequentially transmit rotation by meshing the teeth of adjacent gears with each other. In order to avoid making the drawing complicated, in FIG. 18, a line connecting the tips of the gears is represented by a fine one-dot-chain line, and a line connecting the roots of the gears is represented by a bold solid line. Accordingly, a double circular shape by the bold solid line and the fine one-dot-chain line represents a gear. In regard to the fine one-dot-chain line representing the tip, the entire circumference is not displayed, and only near a portion to be meshed with another gear is displayed.

A small gear 602g is coaxially provided in the rotating disc 602, and the gear 602g is meshed with the gear train 604. As a result, the rotation of the rotating disc 602 is transmitted to the gear train 604 while being reduced in speed at a predetermined ratio. The rotation of the gear is transmitted to the indicator representing the time, and the time is displayed. If the rotational moving mechanism 10 of the fifth modification is provided in a state where the table 30 is coaxially fixed to the rotating disc 602, the moving mechanism 10 is operated to rotate the rotating disc 602.

Figure 19:
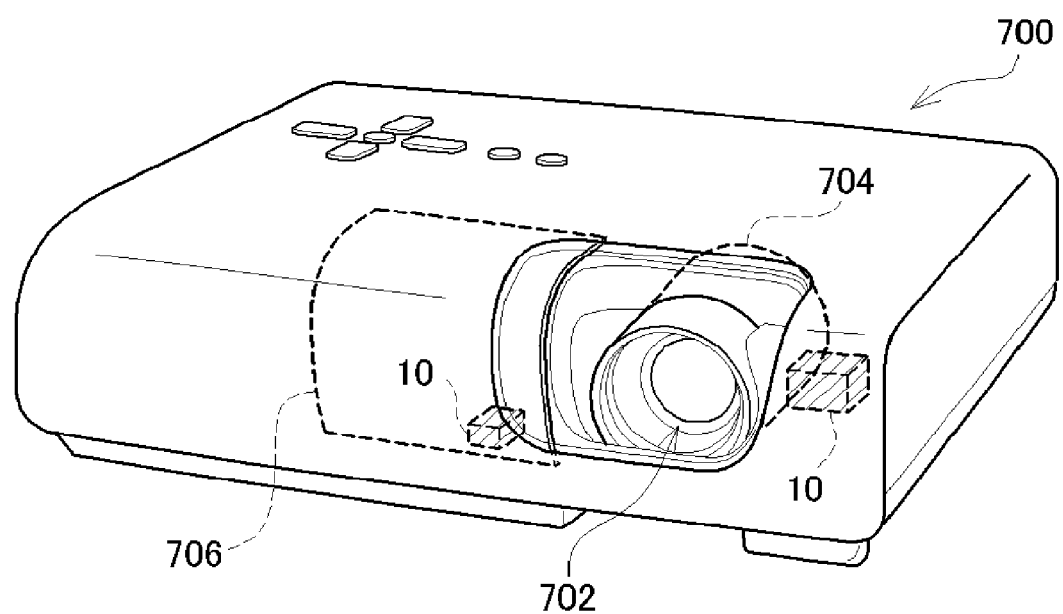
FIG. 19 is a perspective view illustrating a projection device in which a moving mechanism of this example or a modification is incorporated.

FIG. 19 is an explanatory view illustrating a projection device 700 in which the moving mechanism 10 of this example or the modification is incorporated. As shown in FIG. 19, the projection device 700 includes a projection unit 702 including an optical lens, and projects light from an internal light source (not shown) to display an image. The moving mechanism 10 of this example or the modification may be used for an adjustment mechanism 704 for focusing the optical lens included in the projection unit 702. Since the moving mechanism 10 has high resolution of positioning, the optical lens can be moved to perform fine focusing. While light from the light source is not projected, the optical lens of the projection unit 702 is covered with a lens cover 706, whereby it is possible to prevent the optical lens from being damaged. The moving mechanism 10 of this example or the modification may be used so as to open or close the lens cover 706.

Although the moving mechanism according to the example of the invention and various devices in which the moving mechanism is mounted have been described, the invention is not limited to the foregoing example, the modifications, and the application examples, and may be carried out in various forms within a scope not departing from the gist of the invention.

For example, in the foregoing example, the cross-section shapes of the inner grooves 42 and the outer grooves 48 are the V shape. However, the sectional shapes of the inner grooves 42 and the outer grooves 48 are not limited thereto, and any shapes may be used insofar as the rolling bodies, such as the balls 44, are rollably pinched. For example, a semicircular shape may be used. When the balls 44 of the same size are used, if a semicircular groove is provided, it should be understood that the depth of the groove may be small compared to the V-shaped groove, thereby suppressing processing costs for forming the groove. Even when there is a restriction on the depth of the groove to be formed (for example, even when it is difficult to secure the thickness of the guide rail 40), it becomes possible to form the groove which receives the balls 44.

In the foregoing example, a plurality of balls 44 are inserted as rolling bodies between the inner grooves 42 and the outer grooves 48. However, the rolling bodies are not limited to the balls 44 insofar the rolling bodies can roll between the inner grooves 42 and the outer grooves 48 to smoothly move the table 30. For example, a cross roller in which cylindrical rollers are arranged to be alternately perpendicular to each other along the inner grooves 42 and the outer grooves 48 may be used. In the cross roller, the rollers come into linear contact with the grooves, whereby the rollers can endure a high load compared to a case where the balls 44 (which come into point contact with the grooves) are used. As a result, if the cross roller is used, it is possible to increase rigidity of the moving mechanism 10.

Although in the foregoing example and the modifications, the arrangement relationship between the support 20 and the table 30 is in the up-down direction (vertical direction), the invention is not limited thereto, and for example, the arrangement relationship may be in the left-right direction (horizontal direction). In this way, if the arrangement relationship between the support 20 and the table 30 is changed, the degree of freedom for layout of the moving mechanism 10 increases. As a result, it becomes easy to adapt to a case where there is a restriction in the arrangement space of the moving mechanism 10 or a case where a plurality of moving mechanisms 10 are combined.

Figure 20:
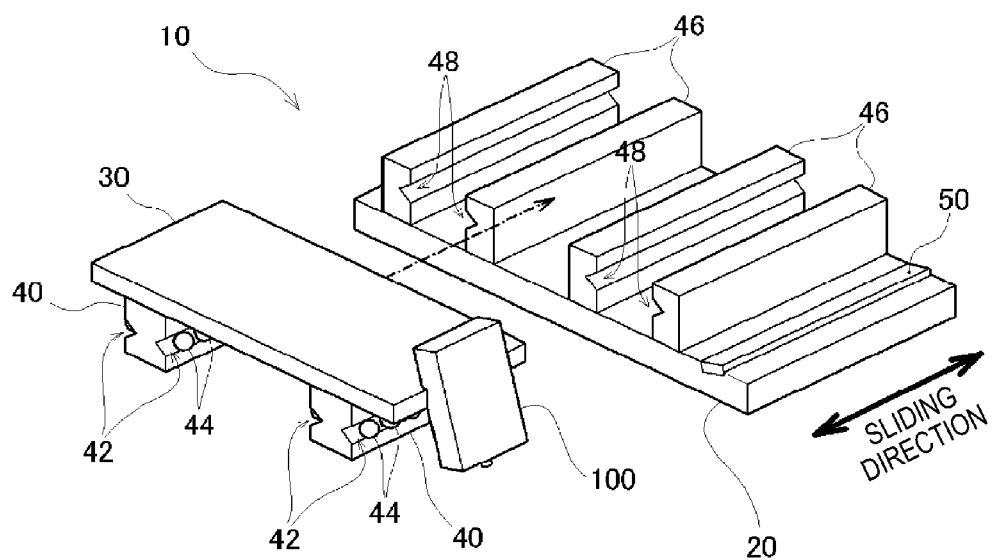
FIG. 20 is an explanatory view showing an example where two sets of guide rails and rail receivers are provided.

Although in the foregoing example, a set of guide rail 40 and rail receiver 46 are provided between the support 20 and the table 30, as shown in FIG. 20, two or more sets of guide rails 40 and rail receivers 46 may be provided. In the example shown in FIG. 20, two guide rails 40 are provided in the lower surface (the surface facing the support 20) of the table 30 parallel to the moving direction, and the two guide rails 40 are arranged to be separated from each other in a direction perpendicular to the moving direction. Two rail receivers 46 are provided in the upper surface (the surface facing the table 30) of the support 20 parallel to the moving direction to correspond to the two guide rails 40 on the table 30 side. In this way, a plurality of sets of guide rails 40 and rail receivers 46 are provided, whereby it is possible to reduce a load applied to each set and to increase rigidity of the moving mechanism 10.

The entire disclosure of Japanese Patent Application No. 2012-132646 filed Jun. 12, 2012 is incorporated by reference.

What is claimed is:

1. A moving mechanism comprising:
a support;
a moving body which moves in a predetermined moving direction with respect to the support;
a pair of first grooves which are provided on the support and formed parallel to the moving direction;
a pair of second grooves which are provided on the moving body and face the first grooves;
a plurality of rolling bodies which are provided between the first grooves and the second grooves, and roll in accordance with movement of the moving body;
two rows of moving shafts which include the rolling bodies rolling between the first grooves and the second grooves, and are parallel to the moving direction, the two rows of the moving shafts are separated from each other in a direction intersecting a direction in which the support and the moving body face each other; and
a vibrating body which includes a piezoelectric material generating vibration and is supported by one of the support and the moving body while being biased toward the other one of the support and the moving body,
wherein a direction in which the first grooves and the second grooves face each other intersects the direction in which the support and the moving body face each other, and the positional relationship between the first grooves and the second grooves is reversed between the two rows of moving shafts, and
a biasing direction in which the vibrating body is biased is inclined with respect to a moving surface including the two rows of moving shafts.

2. The moving mechanism according to claim 1,
wherein, in a portion of one of the support and the moving body to which the vibrating body is biased, a pressure receiving body which is formed in a substantially rectangular parallelepiped shape is provided in a posture such that a surface with which the vibrating body comes into contact and the biasing direction are perpendicular to each other.

3. The moving mechanism according to claim 2,
wherein the pressure receiving body is formed of a material having a hardness that is higher than that of one of the support and the moving body in which the pressure receiving body is provided.

4. A robot hand comprising:
a plurality of finger portions;
a base on which the finger portions are movably provided; and
the moving mechanism of claim 1 which moves the finger portions with respect to the base.

5. An electronic component transport device comprising:
a holding unit which holds an electronic component; and
the moving mechanism of claim 1 which moves the holding unit holding the electronic component.

6. An electronic component inspection device comprising:
a holding unit which holds an electronic component;
the moving mechanism of claim 1 which moves the holding unit holding the electronic component; and
an inspection unit which inspects the electronic component.

7. A liquid feed pump comprising:
a tube through which a liquid is flowable;
a blocking unit which comes into contact with the tube to block the tube; and
the moving mechanism of claim 1 which moves the blocking unit.

8. A printing device comprising:
a print head which prints an image on a medium; and
the moving mechanism of claim 1 which moves the print head.

9. A projection device comprising:
a light source which generates light;
a projection unit which includes an optical lens and projects light; and the moving mechanism of claim 1 which moves the optical lens.

10. A moving mechanism comprising:

a support;

a moving body which moves in a predetermined moving direction with respect to the support;

a pair of first grooves which are provided on the support and formed parallel to the moving direction;

a pair of second grooves which are provided on the moving body and face the first grooves;

a plurality of rolling bodies which are provided between the first grooves and the second grooves, and roll in accordance with movement of the moving body;

two rows of moving shafts which include the rolling bodies rolling between the first grooves and the second grooves, and are parallel to the moving direction, the two rows of the moving shafts are separated from each other in a direction intersecting a direction in which the support and the moving body face each other; and a vibrating body which includes a piezoelectric material generating vibration and is supported by one of the support and the moving body while being biased toward the other one of the support and the moving body, wherein a direction in which the first grooves and the second grooves face each other intersects the direction in which the support and the moving body face each other, and the positional relationship between the first grooves and the second grooves is reversed between the two rows of moving shafts, the vibrating body is biased toward one of the support and the moving body at a position separated from a moving surface including the two rows of moving shafts, and a biasing direction in which the vibrating body is biased is parallel to the moving surface and intersects the moving direction.

11. A robot hand comprising:

a plurality of finger portions;

a base on which the finger portions are movably provided; and the moving mechanism of claim 10 which moves the finger portions with respect to the base.

12. An electronic component transport device comprising:

a holding unit which holds an electronic component; and the moving mechanism of claim 10 which moves the holding unit holding the electronic component.

13. An electronic component inspection device comprising:

a holding unit which holds an electronic component;

the moving mechanism of claim 10 which moves the holding unit holding the electronic component; and an inspection unit which inspects the electronic component.

14. A liquid feed pump comprising:

a tube through which a liquid is flowable, a blocking unit which comes into contact with the tube to block the tube, and the moving mechanism of claim 10 which moves the blocking unit.

15. A printing device comprising:

a print head which prints an image on a medium; and the moving mechanism of claim 10 which moves the print head.

16. A projection device comprising:

a light source which generates light;

a projection unit which includes an optical lens and projects light; and the moving mechanism of claim 10 which moves the optical lens.

17. A moving mechanism comprising:

a support which supports a movable mechanism;

a moving body which is arranged movably in a predetermined moving direction with respect to the support;

a first groove which is provided in the support and formed parallel to the moving direction;

a second groove which is provided in the moving body, is formed parallel to the moving direction, and is formed at a position facing the first groove; and a vibrating body which is arranged in the support and biased to press the moving body or is arranged in the moving body and biased to press the support, wherein a direction in which the first groove and the second groove face each other intersects a direction in which the support and the moving body face each other, and a biasing direction in which the vibrating body is biased intersects the direction in which the first groove and the second groove face each other and the direction in which the support and the moving body face each other.

18. A robot hand comprising:

a finger portion;

a base on which the finger portion is movably provided; and the moving mechanism of claim 17 such that the moving body is provided with the base.

19. An electronic component transport device comprising:

a holding unit which holds an electronic component;

a support which supports the movable mechanism of claim 17 such that the moving body is provided with the holding unit.

20. An electronic component inspection device comprising:

a holding unit which holds an electronic component;

an inspection unit which inspects the electronic component;

a support which supports the movable mechanism of claim 17 such that the moving body is provided with the holding unit.

21. A moving mechanism comprising:

a support which supports a movable mechanism;

a moving body which is arranged movably in a predetermined moving direction with respect to the support;

a first groove which is provided in the support and formed parallel to the moving direction;

a second groove which is provided in the moving body, is formed parallel to the moving direction, and is formed at a position facing the first groove; and a vibrating body which is arranged in the support and biased to press the moving body or is arranged in the moving body and biased to press the support, wherein a biasing direction in which the vibrating body is biased is parallel to a plane including a direction in which the first groove and the second groove face each other and a direction in which the support and the moving body face each other, and a portion of the vibrating body which presses the support or the moving body is separated from the plane.

22. A robot hand comprising:

a finger portion;

a base on which the finger portion is movably provided; and the movable mechanism of claim 21 such that the moving body is provided with the base.

23. An electronic component transport device comprising:
a holding unit which holds an electronic component;
a support which supports the movable mechanism of claim 21 such that the moving body is provided with the holding unit.

24. An electronic component inspection device comprising:
a holding unit which holds an electronic component;
an inspection unit which inspects the electronic component;
a support which supports the movable mechanism of claim 21 such that the moving body is provided with the holding unit.

* * * * *